United States Patent
Sallas et al.

(10) Patent No.: US 7,859,945 B2
(45) Date of Patent: Dec. 28, 2010

(54) EFFICIENT SEISMIC DATA ACQUISITION WITH SOURCE SEPARATION

(75) Inventors: John James Sallas, Plano, TX (US); John B. Gibson, Arlington, TX (US)

(73) Assignee: CGGVeritas Services Inc., Houston, TX (US)

( * ) Notice: Subject to any disclaimer, the term of this patent is extended or adjusted under 35 U.S.C. 154(b) by 652 days.

(21) Appl. No.: 11/774,055

(22) Filed: Jul. 6, 2007

(65) Prior Publication Data
US 2009/0010103 A1 Jan. 8, 2009

(51) Int. Cl.
*G01V 1/04* (2006.01)
(52) U.S. Cl. ................... 367/190; 367/189
(58) Field of Classification Search ............ 367/189, 367/190; 708/250
See application file for complete search history.

(56) References Cited

U.S. PATENT DOCUMENTS

| | | | |
|---|---|---|---|
| 3,288,243 A | 11/1966 | Silverman | |
| 3,811,038 A * | 5/1974 | Reddaway | 708/250 |
| 4,069,470 A | 1/1978 | Cunningham et al. | |
| 4,168,485 A | 9/1979 | Payton et al. | |
| 4,296,213 A | 10/1981 | Cuscurida et al. | |
| 4,486,866 A | 12/1984 | Muir | |
| 4,715,020 A | 12/1987 | Landrum, Jr. | |
| 4,799,201 A | 1/1989 | Nelson | |
| 4,823,326 A | 4/1989 | Ward | |
| 4,953,657 A | 9/1990 | Edington | |
| 4,969,129 A | 11/1990 | Currie | |
| 4,982,374 A | 1/1991 | Edington et al. | |
| 5,031,130 A * | 7/1991 | Harada | 708/250 |
| 5,426,618 A | 6/1995 | Chen et al. | |
| 5,703,833 A | 12/1997 | Allen | |
| 5,719,821 A | 2/1998 | Sallas et al. | |

(Continued)

FOREIGN PATENT DOCUMENTS

WO    WO-/2005/019865    3/2005

(Continued)

OTHER PUBLICATIONS

Error-correcting codes; Peterson W.Wesley, 1924; Cambridge, M.I.T. Press c1961; ASIN: B0000CL17X; pp. 251-261.

(Continued)

*Primary Examiner*—Mark Hellner
(74) *Attorney, Agent, or Firm*—Fulbright & Jaworski, L.L.P.

(57) ABSTRACT

A method for the simultaneous operation of multiple seismic vibrators using unique modified pseudorandom sweeps and recovery of the transmission path response from each vibrator is disclosed. The vibrator sweeps are derived from pseudorandom binary sequences modified to be weakly correlated over a time window of interest, spectrally shaped and amplitude level compressed. Cross-correlation with each pilot signal is used to perform an initial separation of the composite received signal data set. Recordings of the motion of each vibrator are also cross-correlated with each pilot, windowed, and transformed to form a source cross-spectral density matrix in the frequency domain useful for source signature removal and for additional crosstalk-suppression between the separated records. After source signature removal in the frequency domain an inverse transform is applied to produce an estimate of each source-to-receiver earth response in the time domain. The method has application to both land and marine geophysical exploration.

20 Claims, 15 Drawing Sheets

U.S. PATENT DOCUMENTS

| | | |
|---|---|---|
| 5,721,710 A | 2/1998 | Sallas et al. |
| 5,901,112 A | 5/1999 | Walker |
| 6,028,818 A * | 2/2000 | Jeffryes .................. 367/20 |
| 6,161,076 A | 12/2000 | Barr et al. |
| 6,327,537 B1 | 12/2001 | Ikelle |
| 6,370,477 B1 | 4/2002 | Vermeer et al. |
| 6,545,944 B2 | 4/2003 | de Kok |
| 6,664,788 B2 | 12/2003 | Hornbostel et al. |
| 6,687,619 B2 | 2/2004 | Moerig et al. |
| 6,704,245 B2 | 3/2004 | Becquey et al. |
| 6,754,590 B1 | 6/2004 | Moldoveanu |
| 6,766,256 B2 | 7/2004 | Jeffryes et al. |
| 6,807,508 B2 | 10/2004 | Becquey et al. |
| 6,842,701 B2 | 1/2005 | Moerig et al. |
| 6,865,488 B2 * | 3/2005 | Moerig et al. .................. 702/14 |
| 2003/0176974 A1 | 9/2003 | Baliguet et al. |
| 2006/0018192 A1 | 1/2006 | Jeffryes et al. |
| 2006/0164916 A1 | 7/2006 | Krohn et al. |
| 2007/0091721 A1 | 4/2007 | Jeffryes |

FOREIGN PATENT DOCUMENTS

WO    WO-/2006/018728    2/2006

OTHER PUBLICATIONS

Spread spectrum systems: with commercial applications; Robert C. Dixon; 3rd ed., New York: Wiley, c1994; ISBN: 0471593427; pp. 500-503.

International Search Report issued Sep. 5, 2008 during the prosecution of International Application No. PCT/US06/68808.

Written Opinion issued Sep. 5, 2008 during the prosecution of International Application No. PCT/US06/68808.

International Preliminary Report on Patentability, issued Jan. 12, 2010 (published Jan. 12, 2010) during the prosecution of International Application No. PCT/US2008/068808.

* cited by examiner

EFFICIENT SEISMIC DATA ACQUISITION WITH SOURCE SEPARATION

TECHNICAL FIELD

This invention relates generally to the field of seismic exploration, and more particularly, to methods for generating and processing simultaneous vibrator data.

BACKGROUND OF THE INVENTION

Geophysical prospectors have found seismic vibrators to be useful signal sources for imaging the earth. Conventional seismic acquisition in the past generally employed multiple vibrators acting together and initiated simultaneously to form a source array. In land-based operations, the vibrators are positioned at a source location and synchronized to the same pilot sweep signal. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. For reflection seismology, the record length is typically set to equal the sweep length plus a listen time equal to the two-way travel time, which is the time required for the seismic energy to propagate from the source through the earth to the deepest reflector of interest and back to the receiver. In typical applications the recorded seismic data is cross-correlated with the pilot sweep signal. If ambient noise is problematic, the sweep and recording process is repeated several times to form a stack, which is a method of averaging the recordings together to improve signal-to-noise ratio. Stacking can be performed on either the raw uncorrelated data or the correlated records. The vibrators are then moved to a new source location and the process is repeated.

The conventional method has a number of shortcomings some of which include: 1) poor source control; 2) harmonic distortion emissions by the vibrators; 3) intra-array statics because the vibrators are at different elevations or variations in the near surface that can affect source coupling to the earth; 4) spatial resolution issues due to array effects and limitation in source effort because of economic constraints; 5) control and synchronization problems associated with the use of multiple sources; and 6) mixed-phase data produced by the correlation process. Improvements in technology and reductions in the per channel cost Of recording have resulted in an industry push toward using point source-point receiver methods to overcome some of the problems associated with source arrays and large receiver arrays. In land surveys today, the use of point receivers has rapidly increased productivity in deploying the receiver spread. As a result, the vibrators have become the weak link in achieving efficient field operations.

Over the years a number of methods have been introduced to address shortcomings with conventional seismic survey methods. These new methods can generally be categorized as: 1) methods to improve data quality, and 2) methods to reduce cost or improve data acquisition efficiency. One method, titled "Method for Continuous Sweeping and Separation of Multiple Seismic Vibrators," by Krohn and Johnson attempts to address both the data quality and data acquisition issues. (See WO/2005/019865). This method is an extension of the High Fidelity Vibratory System ("HFVS") originally developed by MOBIL and ARCO in the late 1990's (See U.S. Pat. Nos. 5,719,821 and 5,721,710). The MOBIL-ARCO alliance developed a data acquisition and data processing technique that eliminates vibrator intra-array statics problems, mitigates vibrator control errors, provides minimum phase data, and provides high spatial resolution. However, in order to provide a cost effective method for effectively collecting point source data, a means to separate vibrators sweeping simultaneously was necessary.

HFVS, in its original implementation, required the collection of uncorrelated data sets. Measured source signals from each vibrator and received signals are required. For sweeps utilizing swept sine waves, HFVS requires a phase offset encoding scheme that is unique for each vibrator. To compensate for possible corruption of one of the sweeps, additional sweeps could be executed to create an over-determined data set useful for further improving the signal-to-noise ratio. Further, conventional HFVS technology requires, at a minimum, as many records as sources per source location to achieve source separation. For example, using four vibrators requires at least four records. With a 12 second sweep and a five-second listen for each record, the total duration is 68 seconds. Many recording systems may also require additional time for a system reset after each record. If, for example, the system reset time is two seconds the total duration increases to 76 seconds.

Continuous HFVS is a new EXXON-MOBIL technique that combines a variation of the EXXON-MOBIL Cascaded Sweep technique and HFVS. By linking sweeps together with no listen time between segments, recording acquisition time is reduced. For example, a four vibrator implementation with four 12 second sweep segments and a five-second listen time and collected in one record has a total duration of 53 seconds. Compared to the 68-second duration in HFVS, this approach can result in a 22 percent timesaving. In practice, the record is processed by dividing the longer record into shorter records, and then conventional HFVS processing is performed.

HFVS-methods have some technical drawbacks including: 1) low frequency noise in the inverted records because of an absence of low frequencies in the source signal; 2) not capturing all harmonic energy produced in the measured source signal; 3) a large data volume; 4) poor quality control because uncorrelated data is used ("shooting blind"); and 5) source outputs using phase offset encoding, resulting in highly correlated source signals that require reliable phase encoding for good separation.

With the Continuous HFVS method, there is a high potential for problems associated with crosstalk between segments. In conventional seismic acquisition, up-sweeps are used to mitigate the interference caused by harmonic distortion emissions. The correlation process moves artifacts associated with harmonic distortion into negative time so that they do not interfere with weaker reflections arriving later in time. Because phase-encoded cascaded up-sweeps repeat the same low frequencies during the listen time of a prior sweep segment and harmonic emissions are often strong during the low frequency generation portion of a sweep, harmonic emissions from a subsequent segment might arrive from a shallow reflector at the same time as weak deep reflection data due to emissions in an earlier sweep segment. This can happen even though correlation is not employed for several reasons. First, the process of inversion, which is the process of forming a ratio between a received signal and a measured source signal in the frequency domain, tends to deal with the phase between two signals in the same way. That is, the phase spectrum of a wavelet produced by the process of inversion and cross-correlation between the same two signals is the same. If the vibrator-measured signal for an upsweep does not fully characterize the harmonic emissions from the source, any residual harmonics will be mapped into negative time. This is similar to conventional seismic prospecting where a pilot signal that contains no harmonics is correlated with the seismic response data containing harmonic emissions. Second, the source-to-earth coupling problem is generally nonlinear. While the measured source signal is helpful, it does not completely characterize or measure all the radiated harmonic energy. Third, the source-to-earth coupling may change as the vibrator compacts the earth during the sweep or sweep segments. This compacting may cause the travel time from the vibrator to the receiver to deviate slightly from sweep to sweep or from sweep segment to sweep segment. Because phase encoding methods assume that the transmission path will remain constant between sweeps or sweep segments, data separation may be compromised. Fourth, with Continuous HFVS there is an increase in the potential for problems associated with this residual harmonic energy from a later sweep segment interfering with deep reflection events from an earlier segment. However, with standard FIFVS the consequences of some residual harmonic energy bleeding through are generally minimal. On an up-sweep, this residual harmonic energy will be mapped to the early part of the record where there are strong reflectors and not interfere with weak deep reflection events later in the record. Finally, for Continuous HFVS the assumption that sweep segment length exceeds the two-way travel time to the deepest reflector of interest does not guarantee residual harmonic energy will not cause interferences between sweep segments. While superposition and linearity assumptions may work with model data, these assumptions fail to simulate the real impact of residual harmonic energy. Further, the accepted industry guideline for crosstalk between the separated source signals to fall below −40 dB is demanding.

The cost of seismic surveys depends heavily on the time required to collect the data. To reduce the acquisition time a number of methods have been devised over the years. Methods for source separation disclosed vibrator sources that are operated concurrently to reduce the time required for acquiring seismic survey data. For example, two groups of vibrators shooting into the same receiver spread at different offsets can be used to form a composite record. Most of those methods involve some form of swept sine wave source signal and rely on properties of the sweeps to be separated by correlation. Some methods rearrange portions of a conventional swept sine wave to mitigate crosstalk between surveys due to cross-correlation between the sweeps employed (See U.S. Pat. Nos. 4,168,485 and 4,982,374). Others achieve separation by using phase encoding schemes sometimes combined with up-sweeps and down-sweeps (See U.S. Pat. No. 4,823,326), and still others use time delays (See U.S. Pat. No. 4,953,657). Still others use techniques such as slip-sweep that combine conventional swept sine waves, time delayed starts, and processing methods of F-T filtering, deconvolution, and migration to achieve separation (See WO 2006/018728).

Although fewer in number, there are several schemes for seismic prospecting that employ coded seismic signals generated by pseudorandom sequences (See U.S. Pat. Nos. 4,969,129, 6,704,245, and 6,807,508). Both U.S. Pat. Nos. 6,704,245 and 6,807,508 disclose the use of Pseudorandom Binary Sequences ("PRBS") that are used to phase modulate a periodic sine wave and may include the phase modulation of a DC signal. PRBS of maximal length, also known as Galois sequences, can be generated from irreducible, or primitive, polynomials. These PRBS have the property that correlation side lobes are distributed fairly evenly and any artifacts produced by harmonic distortion noise emissions tend to be distributed throughout the record after correlation because all frequencies are generally emitted at all times. There is no temporal separation of spectral content as might occur in swept sine wave type sweeps. Additionally, spreading out the spectral content of the sweep, rather than being concentrated for only a portion of the sweep, reduces the temporal peak energy of a given spectral element. Thus structural resonances are not excited and windows on nearby structures are not rattled as badly as with swept sine waves. A large collection of sequences known as Gold codes can be generated from special pairs of irreducible polynomials of the same order called preferred pairs. These Gold codes have very desirable characteristics, one of which includes low cross-correlations among the sequences.

To fully realize the low autocorrelation side lobes and desirable cross-correlation properties between different weakly correlated PRBS sweeps, the measured signal is correlated with a repeated version of the pilot sweep made up of at least three sweep repetitions. The low side lobe and crosstalk between sweeps are compromised when the weakly correlated PRBS sweeps are band limited, a sweep sequence comprised of less than a full $2^n-1$ phase shifts is employed, or harmonic distortion is introduced. (The variable "n" is the sequence order. For example, for a polynomial order of 14 (n equals 14) the sequence length would be 16,383.) For a Gold code sequence, it has been shown that the members have cross-correlation and autocorrelation side lobes, $\theta(r)$, bounded by $|\theta(r)| \leq 2^{(n+1)/2}+1$ for n odd, and by $|\theta(r)| \leq 2^{(n+2)/2}-1$ for n even (See, eg. Dixon, Robert C., SPREAD SPECTRUM COMMUNICATIONS (1994)). Again for the example of n equal to 14, the maximum cross-correlation value would be 255 out of a zero lag autocorrelation value of 16,383 or 20 log (255/16383)=−36 dB of crosstalk for two sources working simultaneously. Generally this level of crosstalk is marginal at best and above the industry-acceptable level of crosstalk.

As has been mentioned before, vibrators produce harmonic distortion energy. For HFVS, less than all of the harmonic energy may be mapped into signal. With swept sine wave sweeps, the harmonic energy is well organized. However, using up-sweeps, the harmonic energy is pushed into negative time and is generally not a problem because it is masked by strong arrivals at early times. For pseudorandom sweeps, harmonic energy is not well organized, but is dispersed across the record. For a correlated record, the harmonic energy noise will occur in both positive and negative time and tends to be evenly distributed throughout the record at a low level that is potentially less likely to mask reflectors. Results obtained using pseudorandom sweeps should not be sensitive to where the harmonics are produced and measured because the correlation disperses the harmonics regardless where they enter the process. Further, the overall averaging effect makes sources and source coupling behave more like linear systems.

Another potential advantage to weakly correlated PRBS sweeps is that low frequency energy can be increased without running into vibrator stroke and pump limitations. A typical vibrator, such as the Nomad model 65 vibrator, available from Sercel, Inc., Houston, Tex., that is rated to produce about 62,000 pounds force, can only generate about 12,500 pounds peak force at 3 Hz with a swept sine wave input. At that frequency and output level, the mass is moving about 3 inches peak-to-peak and in danger of hitting the stops. However, using a PRBS sweep, that same 3 Hz energy can be spread out over the entire sweep length at a lower temporal peak-value, producing higher levels of low frequency energy if desired. With regard to the hydraulic power pack and pump, a swept sine wave requires the hydraulic power pack to deliver peak flow at the low frequencies. The peak flow can exceed 200 gallons per minute ("gpm") at the low end of the sweep. Most vibrators cannot deliver this high demand over an extended length of time and, as a result, the hydraulic system pressure drops well below its nominal differential supply pressure of 2,900 psi. Lower system pressure results in lower force generation capability and higher distortion. Typically, flow demand drops to its lowest point between 20 Hz to 50 Hz, where it may go down to as low as 10 gpm to 20 gpm and then begins to increase at the higher frequencies. At the higher frequencies, the combined effect of fluid compressibility and fluid inertia create inefficiency in the system that requires higher flow to sustain a high force output from the vibrator. However, with the PRBS sweep, the peak demand from the hydraulic power pack and pump should be reduced substantially. This is because PRBS sweeps generate all frequencies concurrently. Thus, the peak flow should approach the average flow seen over the course of a conventional chirp sweep and peak demand will likely fall to approximately 100 gpm.

BRIEF SUMMARY OF THE INVENTION

The disclosed invention provides a new method for seismic acquisition using vibrators operating simultaneously. The sweeps employed by the vibrators are based upon modified pseudorandom sequences. These sweep modifications include: 1) spectral reshaping, 2) cross-correlation suppression over a time window of interest, and 3) level compression to restore a favorable root mean square ("RMS") to peak amplitude level. The composite received signal reflected from the subsurface formations is correlated with the pilot sweep signals for preliminary separation. Conventional correlation is employed; therefore no circular permutation is required. Vibrator measured motion and/or force output signals for each source are recorded, correlated and time windowed. The correlated and windowed source signals are then transformed to the frequency domain to produce a cross-spectral density matrix that is inverted to form the source separation matrix. The source separation matrix operates upon a vector of correlated and windowed receiver data to transform it into a separated seismic data set. The individual responses of subsurface formations in the transmission path between each individual source and each seismic detector may be recovered, with the source signature removed.

In accordance with one aspect of the invention, there is provided a method of seismic prospecting comprising the steps of (1) selecting and generating a plurality of weakly correlated pseudorandom sequences; (2) modifying the weakly correlated pseudorandom sequences to minimize crosstalk; (3) generating source signals from the weakly correlated pseudorandom sequences; and (4) transmitting the source signals generated from the weakly correlated pseudorandom sequences to the earth.

In accordance with another aspect of this invention, the method of seismic prospecting described above further comprises the steps of (1) detecting and recording measured signals associated with each source; (2) detecting and recording a composite received signal in response to the transmission of the source signal through the earth; and (3) using the measured signals to separate the transmission path response from the composite received signal.

In accordance with another aspect of this invention, there is provided a method wherein the step of generating a weakly correlated pseudorandom sequence further comprises a pseudorandom number generator. Further, the pseudorandom number generator can comprise (1) a linear feedback shift generator, (2) a pseudorandom number generator algorithm, (3) a Gaussian noise random number generator, or (4) a hardware random number generator.

In accordance with another aspect of this invention, the pseudorandom number generator comprises the steps of (1) selecting a preferred pair of sequences; and (2) combining the preferred pair of sequences using modulo-2 addition.

In accordance with another aspect of this invention, the pseudorandom number generator comprises the steps of (1) selecting a preferred pair of primitive polynomials of a given order; (2) generating a pseudorandom sequence from each polynomial of the preferred pair; (3) applying a suitable delay to one of the pseudorandom sequences; and (4) combining the two sequences using modulo-2 addition (with possible truncation) to generate a quasi-Gold code sequence.

In accordance with another aspect of this invention, there is provided a method wherein the step of modifying the sequences to minimize crosstalk further comprises the steps of (1) sampling the weakly correlated pseudorandom sweep sequences: (2) generating the target spectrum; (3) reshaping the weakly correlated pseudorandom sequences by use of digital filtering; (4) computing cross-correlations between the various weakly correlated pseudorandom sequences and autocorrelations of the sequences; (5) decoupling the weakly correlated pseudorandom sequences; (6) performing level compression of the weakly correlated pseudorandom sequences; (7) filtering the weakly correlated pseudorandom sequences for high frequency noise; (8) computing autocorrelations of the sequences and cross-correlations between the various weakly correlated pseudorandom sequences: and (9) resampling the weakly correlated pseudorandom sequences.

In accordance with another aspect of this invention, there is provided a method for which the weakly correlated pseudorandom sequences are reshaped using the formula Target $(x) = g1(x)g2(x)$ where $g1(x)$ is $(x/F1)^2\{[1-(x/F1)^2]^2 + [1.414 * (x/F1)]^2\}^{-0.5}$ and $g2(x)$ is 1 for x less than or equal to F2 and is $((1+\cos((x-F2)/(F3-F2)*\pi))/2)^2$ for x between F2 and F3, zero for x greater than F3, where $F1=5$, $F2=100$, and $F3=150$.

In accordance with another aspect of this invention, there is provided a method wherein the step of modifying the sequences to minimize crosstalk further comprises a pseudorandom sequence that has a bandwidth of about 10 Hz to about 100 Hz.

In accordance with another aspect of this invention, there is provided a method wherein the step of separating the composite receiver signal further comprises: (1) correlating measured source signals with source pilot signals; (2) correlating the composite received signal with the source pilot signals; (3) windowing the correlated data; (4) Fourier transforming the correlated data from the time domain to the frequency domain; (5) calculating the source separation matrix: (6) creating a receiver cross spectral density column vector for each frequency; (7) calculating the transfer function estimate by multiplying the receiver cross spectral density column vector by the source separation matrix; and (7) inverse Fourier transforming the transfer function back to the time domain.

In accordance with another aspect of this invention, there is provided a method of operating a plurality of seismic vibrators comprising the steps of: (1) selecting and generating a plurality of weakly correlated pseudorandom sequences, (2) modifying the weakly correlated pseudorandom sequences to minimize crosstalk, (3) loading each vibrator with a unique weakly correlated pseudorandom sequence generated to minimize crosstalk, (4) activating all vibrators and using at least one detector to detect and record the composite received signal from all vibrators, (5) separating the composite received signals into individual transmission path estimates.

In accordance with another aspect of this invention, there is provided a method of operating a plurality of seismic vibrators comprising the steps of: (1) selecting and generating weakly correlated pseudorandom sequences, (2) modifying the weakly correlated pseudorandom sequences to minimize crosstalk, (3) loading at least one group of vibrator arrays with unique weakly correlated pseudorandom sequences generated to minimize crosstalk between vibrator arrays (a vibrator array may comprise one or more vibrators), (4) activating all vibrators and using at least one detector to detect and record the composite received signal from all vibrators. (5) separating the composite received signal into individual transmission path estimates.

In accordance with another aspect of this invention, the step of separating the composite received signals into individual transmission path estimates comprises (1) applying a source separation matrix, or (2) correlating the composite received signal with the source pilot signals.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

As used herein, "a" or "an" means one or more than one.

The methods and apparatus of the present invention will now be illustrated with reference to FIGS. 1 through 16D. It should be understood that these are merely illustrative and not exhaustive examples of the scope of the present invention and that variations which are understood by those having ordinary skill in the art are within the scope of the present invention.

Figure 1:
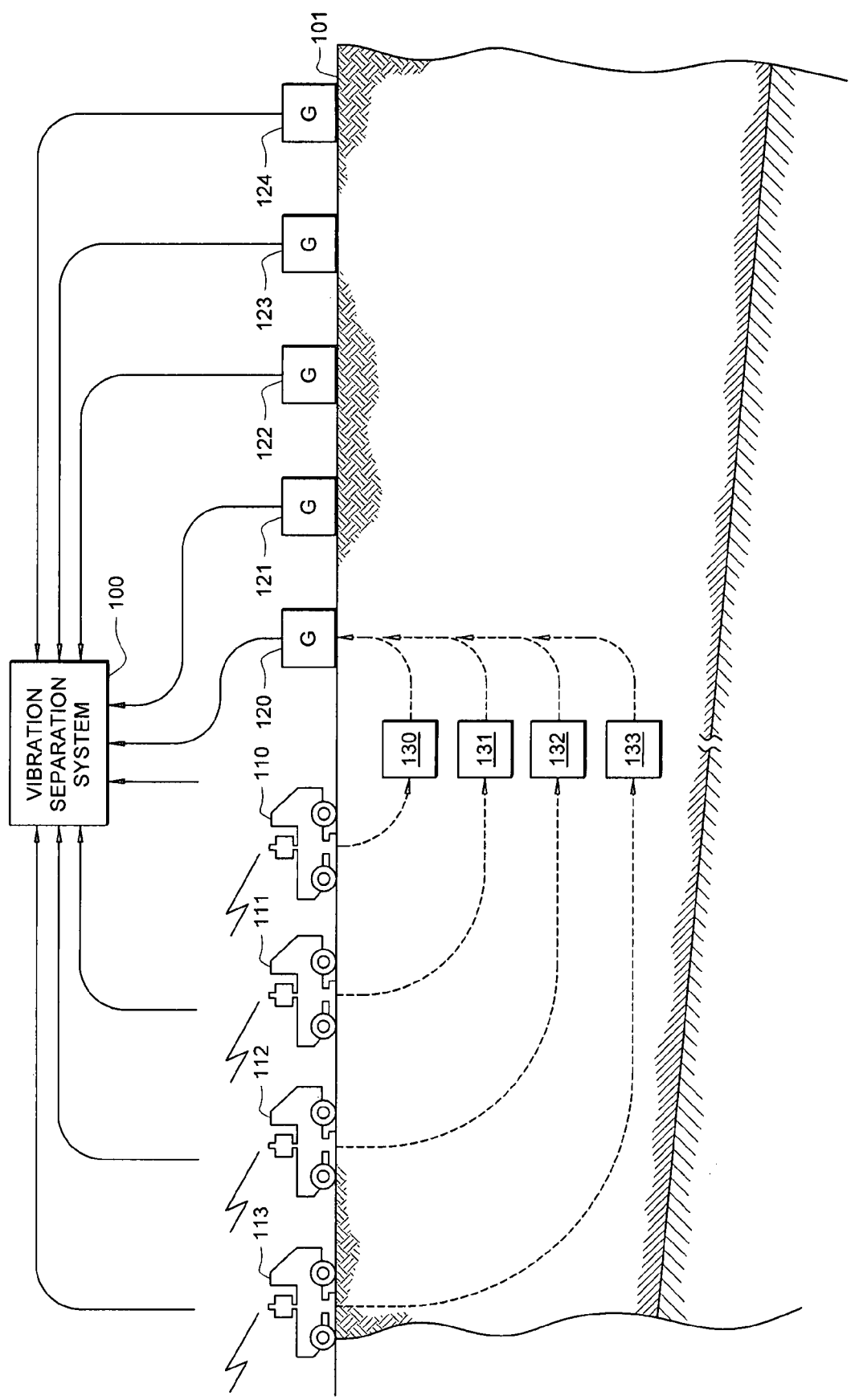
FIG. 1 illustrates a typical field seismic survey according to the present invention.

Looking first to the exemplary survey shown in FIG. 1, four vibrators 110, 111, 112, and 113 are placed at the surface of the earth 101. Vibrators 110, 111, 112, and 113 are conventional truck-mounted vertical P-wave vibrators; however, it is understood that other vibrators, such as horizontal shear-wave vibrators used for 9-C data sets, may be utilized. In this example vibrators 110, 111, 112, and 113 are spaced close to one another and collinear at a distance of about 40 feet from one another; however, the deployment of the vibrators may vary widely depending upon the survey requirements. For example, for a 3-D survey the vibrators may be spaced far apart and not collinear with one another.

Vibrators 110, 111, 112, and 113 are equipped with sweep generator and control system electronics. After receiving a start command, typically initiated via a telemetry link with the recording system, each vibrator begins sweeping. All vibrators are coordinated to sweep simultaneously. Each vibrator sweep generator is loaded with a unique sweep and therefore generates a unique band limited pseudorandom seismic signal.

Sensors attached to vibrators 110, 111, 112, and 113 are connected to vibrator separation system 100. The sensors can be motion sensors, such as accelerometers mounted to the reaction mass, the base plate of the vibrator, or the earth immediately adjacent to the vibrator, a transducer or combination of transducers configured to measure the differential pressure in the actuation chamber of the vibrator, a load cell attached to the bottom of the base plate for measurement of the ground force (contact force), or a weighted sum of the base plate and the reaction mass accelerometers useful for estimating the ground force. Additionally, the sensor could comprise strain gauges mounted on the driven structure of the vibrator to provide an estimate of the ground force. Alternatively, the pilot or reference signal generated by the vibrator controller that the vibrator output follows or a Kalman filter estimate of the ground force provided by the vibrator controller such as a VE4432 available from Sercel, Inc., Houston, Tex., can be utilized for the sensor measurement. The sensor measurement, or some filtered version of the sensor measurement, is the measured signal and represents the actual source vibration imparted to the earth by the vibrator and is transmitted to a recording system. The measured signals are transmitted to the recording system by hardwired link, a radio telemetry link, or by a separate acquisition system that records and stores the measured signals that are downloaded to a recorder at a later time.

Receiver sensors, geophones in this example, 120, 121, 122, 123, and 124 are positioned at the surface of the earth 101 in the survey region at locations displaced from the vibrator position. The receiver sensors may be conventional moving coil type geophones, Micro Electro-Mechanical System (MEMS) sensor elements, or hydrophones for transition zone areas like marshes. In some areas, a receiver sensor may comprise a group of receiver sensors arranged as a receiver array to help attenuate ground roll or other noise modes. Receiver sensors are not limited to vertical component type sensors; horizontal geophones and 3-C geophones/accelerometers may also be used depending upon the nature of the survey to be conducted. For simplicity, 120, 121, 122, 123, and 124 will be considered to be single component vertical geophones configured to function as point receivers in this discussion.

The vibrator measured signals and composite received signals are typically minimum phase relatives of the actual vibrations they are designed to measure and represent the actual energy being radiated or received.

As shown in FIG. 1, vibratory energy radiated by each vibrator 110, 111, 112, and 113 travels through the earth from each vibrator to the receiver sensors 120, 121, 122, 123, and 124 in the survey area. The vibratory signal received by each receiver sensor will actually be a composite signal comprised of contributions from each vibratory source. Transfer functions 130, 131, 132, and 133 represent the transmission path response from vibrator 110, 111, 112, and 113 to receiver sensor 120 respectively. The transfer function will depend upon the vibratory signal radiated by each vibrator, the refraction and reflection by the subterranean formations of the vibratory source energy, and the response of the receiver sensor. Subsequent processing steps can be used to remove the embedded response due to the choice of source measured signal and receiver response.

The use of single sweeps simultaneously executed in the vibratory survey provides a reduction in the time required for the survey. Since each receiver sensor recording is a composite seismic record containing a superposition of the contributions of each vibrator source, Vibrator Separation System 100 is required for separating the composite record. Vibrator Separation System 100 has access to records of the pilot sweeps generated, the measured signals, and the composite received signal. This access can be in almost real time through the recording system or via recordings collected earlier and processed on a separate workstation computer.

Figure 2:
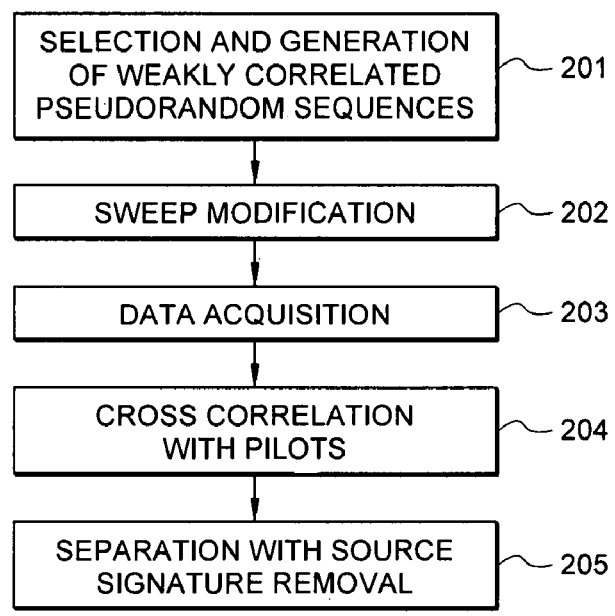
FIG. 2 is a flow chart illustrating an overview of the present invention.

The preferred embodiment of the present invention can now be summarized by reference to the flow chart in FIG. 2. In general, the method includes step 201, selection and generation of weakly correlated PRBS; step 202, sweep modification; step 203, data acquisition; step 204, cross-correlation with pilots; and step 205, separation with source signature removal. These fundamental steps are discussed in detail below.

Selection and Generation of Weakly Correlated Pseudorandom Sequences

Figure 3:
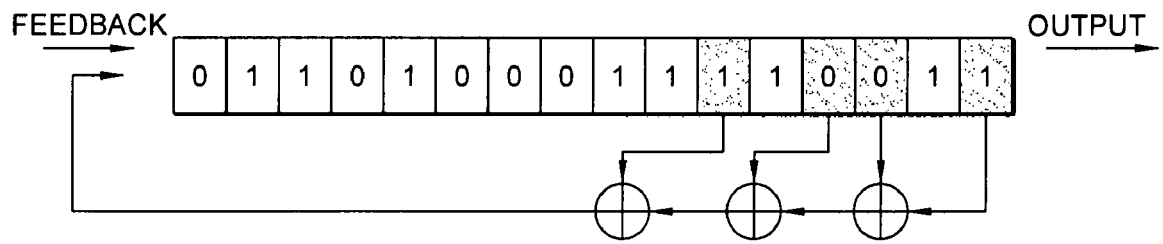
FIG. 3 illustrates a linear feedback shift register generator for generating pseudorandom binary sequences.

First we will discuss step 201, the selection and generation of weakly correlated PRBS. A pseudorandom number generator is used to generate a PRBS. One pseudorandom number generator that can generate very long PRBS is a linear feedback shift register ("LFSR"). An LFSR is a pseudorandom number algorithm that uses a shift register whose input bit is a linear function of its previous states. Generally, taps (bits from the shift register value) are combined together to drive the input bit. The tap sequence chosen affects the code length. It is desirable to generate maximum length codes. For a shift register with N stages, a maximal length code would be a pseudorandom sequence that repeats every $2^N-1$ samples. For example, a shift register generator with 8-stages and appropriately selected taps could generate a maximal length sequence of 255 samples. A 16-bit generator, such as the generator shown in FIG. 3, is capable of generating a sequence of length 65,535. Using a 1-millisecond sample rate, this LFSR could be used to produce a 65 second sweep. A simple computer program or a hardware random number generator can be used as a pseudorandom number generator to produce these same sequences as is understood by those of ordinary skill in the art. See, e.g., Appendix C in Peterson, W. ERROR CORRECTING CODES (1961) for a list of irreducible polynomials of degree 16 or less that could be used to design pseudorandom binary number generators using LFSR.

For example, consider a survey that requires a 50 second sweep with a sweep full-power bandwidth from about 10 Hz to about 100 Hz and low frequency below 10 Hz down by 3 dB at 5 Hz to recover the deepest reflection energy having a two-way travel time, or listen time, of eight seconds. Using the seismic survey described in FIG. 1, a suite of four weakly correlated PRBS must be generated. Typically, there is an upper limit on record length (sweep length+listen time) determined in part by the recorder acquisition system memory capacity. For systems configured with a 2-millisecond sample rate, the upper limit on record length may be 60 seconds. For this case, a 14-bit generator having a maximal length of 16,383 samples with an initial update rate of 4 milliseconds should be adequate. With the 4-millisecond sample rate, Nyquist theory limits this generator to frequencies at half the sample frequency or half of 250 Hz or 125 Hz. At a 4-millisecond interval, the full overall sequence length would be 65.532 seconds; so the sequence length will be truncated to 50 seconds (a 12,500 sequence length).

To facilitate good source separation, it is desirable to use a pseudorandom number algorithm that produces low cross-correlation values between the various vibrator sweeps. For LFSR generated sequences, it is found that for each polynomial order of 12 or greater there exists a "preferred pair" of polynomials giving rise to sequences with a cross-correlation significantly less than that of other pairs of that order. By modulo-2 addition of the time shifts of each LFSR of the preferred pair, a large number of other sequences called Gold codes can be produced with similar cross-correlation properties. A selection process for identifying preferred pairs from the Peterson's Appendix C can be found in Dixon, R. C., SPREAD SPECTRUM COMMUNICATIONS 502 (1994). Using Peterson's table and Dixon's rule one suitable preferred pair of order 14 that can be used to generate Gold codes is given by:

$$X^{14}+X^{13}+X^{12}+X^{11}+X^{10}+X^9X^6+X^5+1, \text{ and}$$

$$X^{14}+X^{13}+X^{10}+X^8+X^6+X^2+1.$$

Figure 4:
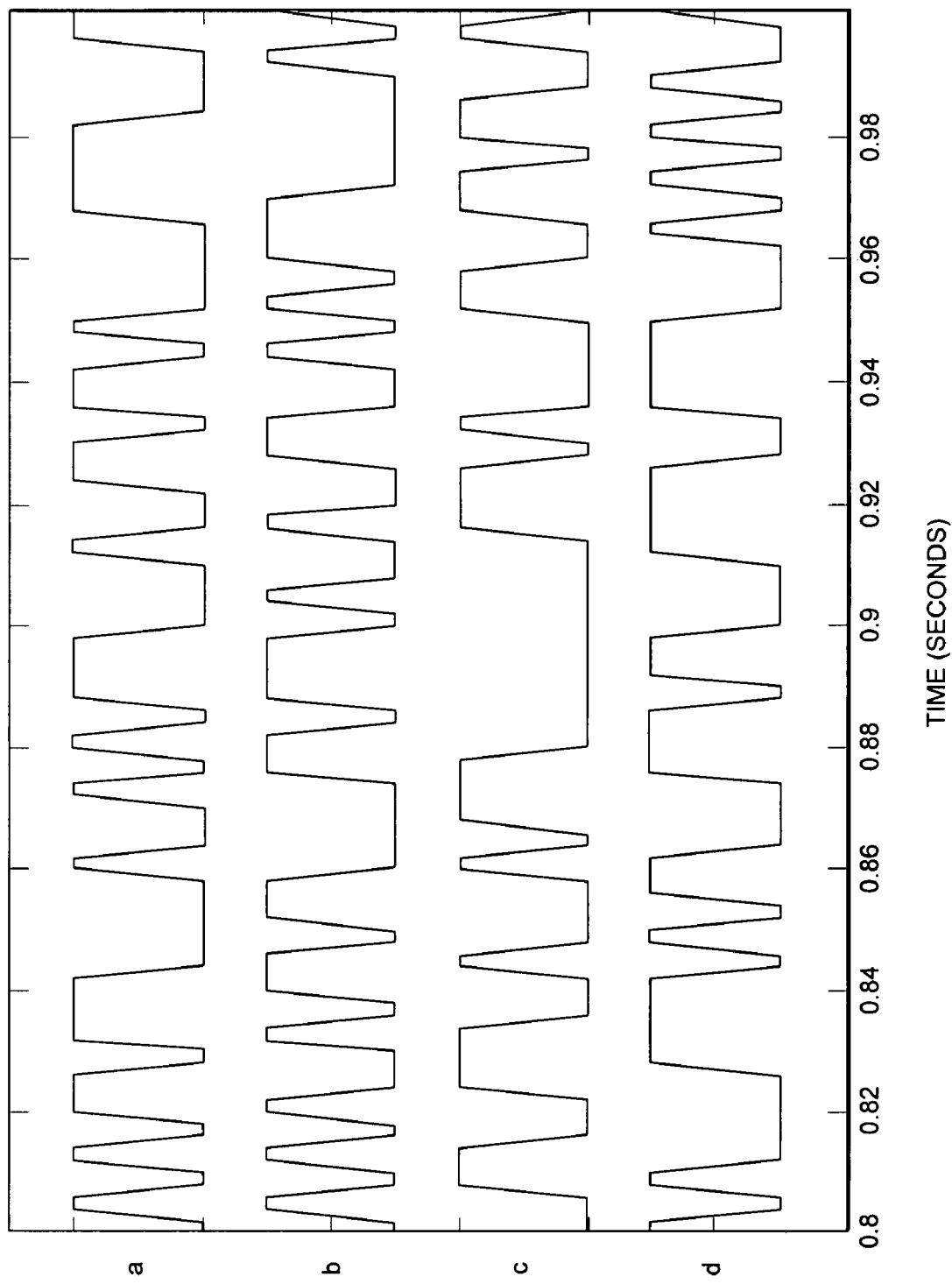
FIG. 4 illustrates a portion of the originating binary sequences: Sequence A, B, C and D.

The exponents represent the tap connections for the feedback positions on the LFSR. In other words, two LFSRs with feedback tap connections corresponding to the equations above could be used to generate maximal sequences of length 16383. The initial state for the shift registers could be all 1's or "11111111111111". In another implementation, the tap locations could be used in a software computer program to act as a feedback mask useful for combining entries from a fourteen-element array stored in the computer with this small array performing the function of the shift register. Also, combining by exclusive-or'ing ("XORing") versions of the parent sequences delayed with respect to one another can generate other Gold code sequences from those preferred pair sequences. For example, XORing the output of one sequence of the preferred pair with no delay with the output of the other sequence of the preferred pair that has been delayed by 31 intervals produces a new PRBS with similar cross-correlation characteristics. Similarly, another weakly correlated sequence can be generated by XORing the output of one of the preferred pair with no delay with the output of the other sequence of the preferred pair that has been delayed by 63 intervals. FIG. 4 shows an enlarged portion of the four weakly correlated PRBS with normalization and DC offset removed to center the waveform about zero.

Sweep Modification

Figure 5:
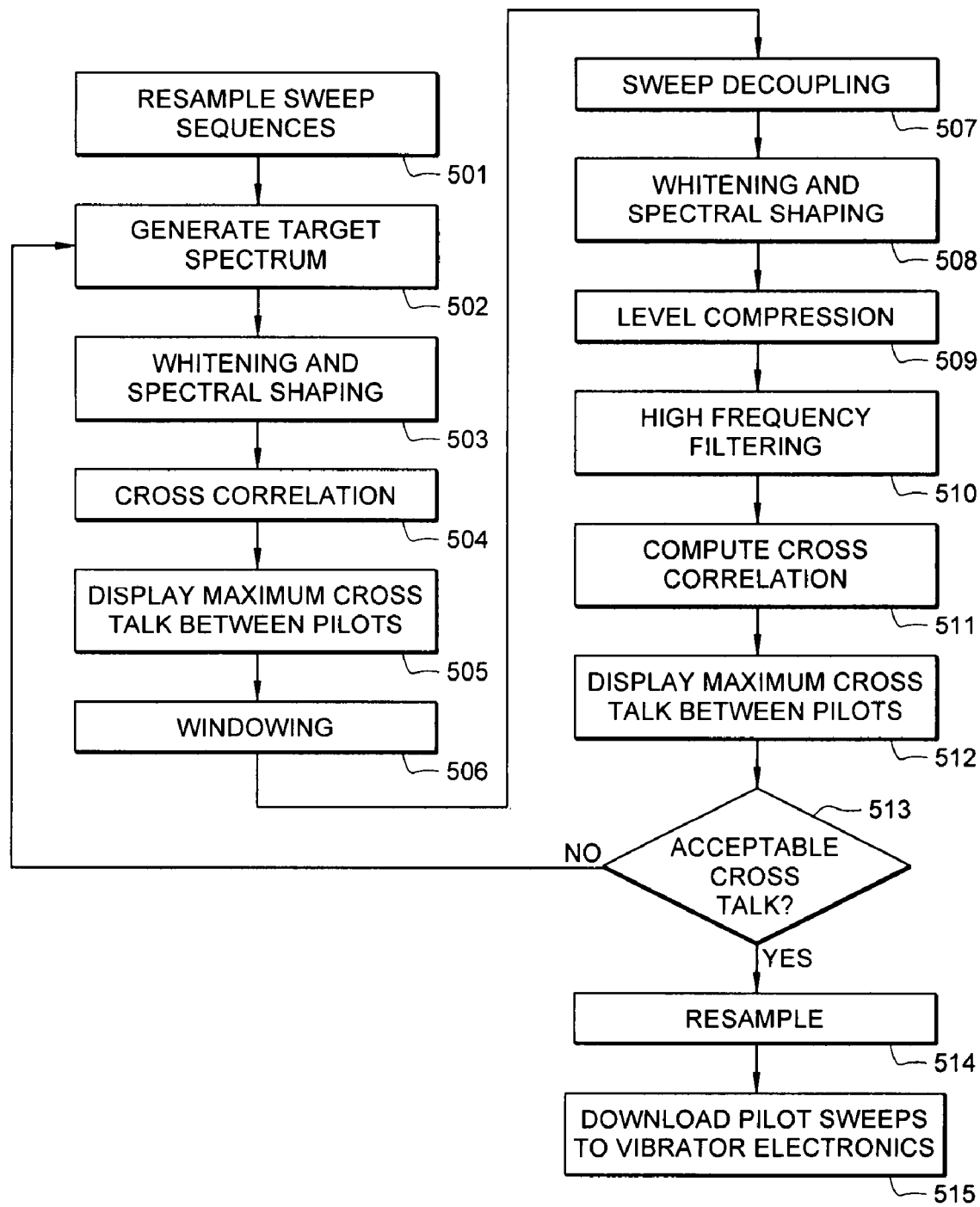
FIG. 5 is a flow chart showing the steps required for sweep modification.

Turning now to FIG. 5, a flow chart detailing the steps required for sweep modification is shown. Again using the sample survey of FIG. 1, the starting point for sweep modification is the four sweep sequences: Sequence A, Sequence B, Sequence C and Sequence D. As a rule of thumb, to facilitate digital filtering and ultimately spectral reshaping, data should be sampled at least four times the highest frequency to be recovered. Fhe first step 501 of sweep sequence modification is to re-sample the sweep sequence at a 2-millisecond sample rate because, for this case, the maximum frequency to be recovered is 100 Hz.

Figure 6:
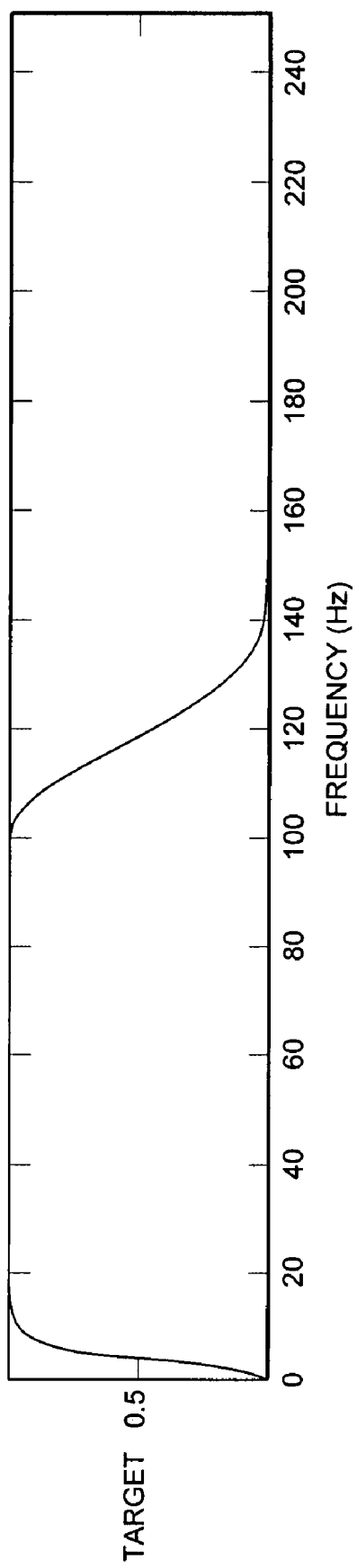
FIG. 6 illustrates a target sweep amplitude spectrum.

The next step 502 is the generation of the desired target sweep amplitude spectrum. There are several considerations in its construction. First, the full power sweep bandwidth to be covered is 10 Hz to 100 Hz. Second, there is some energy outside of the full power sweep bandwidth, in particular some coverage of the very low frequencies. This is to overcome several problems associated with both conventional seismic and with HFVS methods that employ swept sine waves. Swept sine waves are typically up-sweeps and there is practically no energy produced below the start frequency. With the standard HFVS technique, this implies that there is no energy in the source signature for the process of inversion. The net result is essentially a division by zero in the frequency domain (or by a very small number added to stabilize the processing) and an amplification of any low frequency noise received at the receiver (for example, wind noise) that can lead to errors in the estimate of the low frequency response of the earth. Typically subsequent processes, such as spiking deconvolution, are used to increase resolution, by correcting for the high frequency absorption effects of the earth and filtering effects of sensors, in an attempt to recover the reflection sequence of the earth. Many deconvolution operators get their "steering signals" from the amplitude spectrum, a minimum phase assumption is invoked, and any attempt to whiten the record is accompanied by a correction to the phase spectrum. Low frequency noise in the amplitude spectrum can lead to phase errors in the processed section. The impact of all of this can be loss of continuity in the mapping of reflection boundaries. Oftentimes, the low frequency end of the spectrum is just thrown out. Some coherent low frequency energy needs to be preserved to improve the overall continuity of the processed section. For this example we want to retain some low frequency content in the sweep, therefore a gentle roll-off that has a half-power point at 5 Hz will be assumed. At the upper end of the spectrum, there can be similar problems and having some content there can be useful. Again if there is no source energy at the upper end of the spectrum, there is a risk of division by zero with any form of source signature removal. Furthermore, it is helpful to have an amplitude spectrum that rolls off smoothly rather than abruptly to avoid windowing effects like Gibbs phenomenon that can make results look "ringy." For this example, a function which meets these requirements can be formed called Target(x).

$$\text{Target}(x) = g_1(x) g_2(x)$$

where:

$$g_1(x) = \left(\frac{x}{F_1}\right)^2 \left[\left(1 - \left(\frac{x}{F_1}\right)^2\right)^2 + \left(1.414\left(\frac{x}{F_1}\right)\right)^2\right]^{-0.5}$$

and $$g_2(x) = \left(\frac{1 + \cos\left(\left(\frac{x - F_2}{F_3 - F_2}\right)\pi\right)}{2}\right)^2,$$

for $F_2 < x \leq F_3$ $f_2(x) = 1,$ for $x \leq F_2$ $g_2(x) = 0,$ for $x > F_3$ and -continued $F_1 = 5,$ $F_2 = 100,$ $F_3 = 150$ The argument "x" corresponds to the frequency expressed in Hertz. FIG. 6 is a graphical representation of this sweep target amplitude function. Note that the function $g_1$ acts for this case as a low cut or high pass filter, while $g_2$ acts as a low pass or high cut filter. Convolving these functions together creates a band pass filter effect. In this example, the target amplitude spectrum is flat over the range of 10 Hz to 100 Hz, but for the more general case, the target spectrum need not be constrained to be flat over the desired range, but may in fact have some slope to boost the output over some range of frequencies or provide some other desired spectral contour.

Step 503, spectral shaping, can be achieved through application of digital filtering techniques in the frequency domain. After some zero padding to at least twice the sweep length, the four sweep sequences are transformed into the frequency domain through application of an Fast Fourier Transform ("FFT") for each sequence. Zero padding is used to prevent wrap-around alias errors associated with FFT methods. This is good practice since the FFT algorithm essentially assumes that a sequence is periodic, so for signals that are not periodic a "buffer region" of zeroes is helpful. The frequency-transformed sequences are FA(f), FB(f), FC(f) and FD(f). For example, taking the transformed sequence FA(f) as representative, spectral shaping can be accomplished through the action of a digital reshaping filter represented by the following equation:

$$FA^*(f) = FA(f) \text{Target}(f) / \{|FA(f)| + \epsilon\}$$

where $\epsilon$ is a small positive number: and
f is frequency.

A reshaping filter of the same form is applied to each transformed sequence. The shaped sequences are transformed back to the time domain using an Inverse Fast Fourier Transform ("IFFT") operator and any noise introduced by the reshaping filter that lies in the region after the sweep time is zeroed out.

Figure 7:
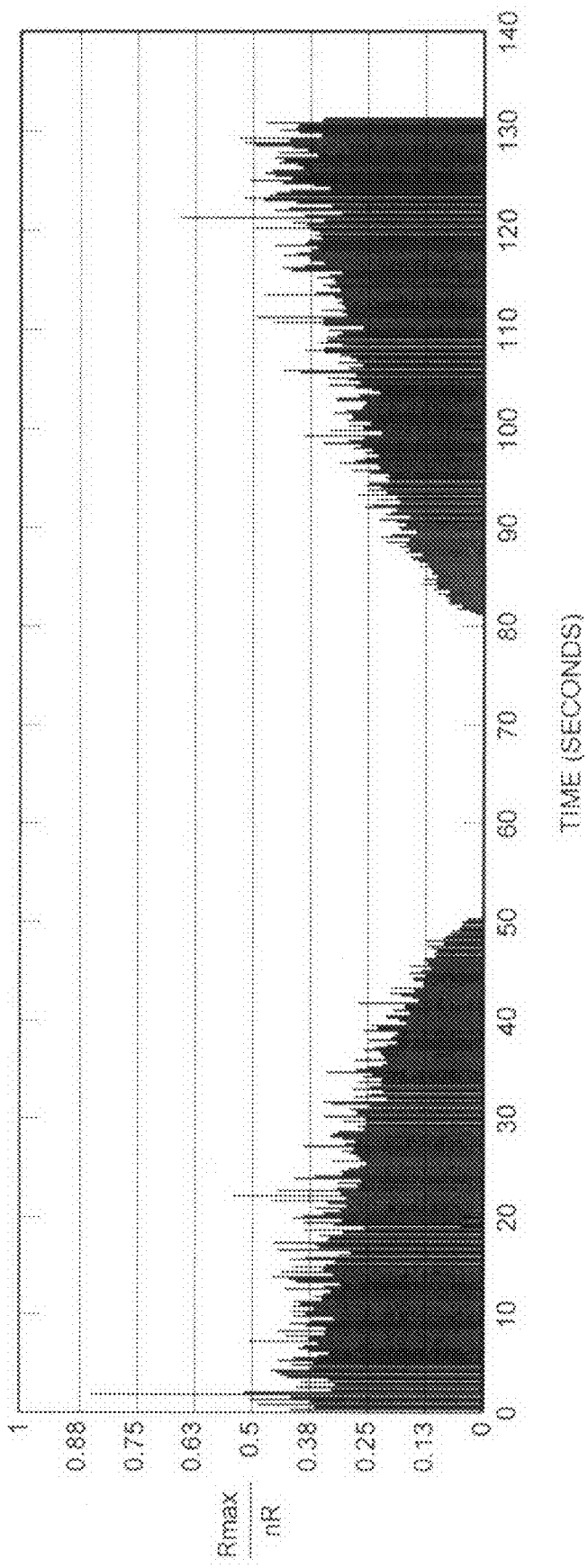
FIG. 7 illustrates normalized Rmax values computed at each lag after spectral shaping but before sweep decoupling.

Next, step 504 computes the cross-correlation between the various sequences and sequence autocorrelations. Correlation may be done in either the time domain or by using FFT methods that can be more computationally efficient. A function $\text{Rmax}_i$ can be constructed to provide an easy means of checking overall performance. $\text{Rmax}_i$ is defined as the maximum element for the set containing the absolute value for all cross-correlation values at time lag "i". ($\text{Rmax}_i$ excludes autocorrelation values.) In the optional step 505, the Rmax values may be displayed to indicate crosstalk to be removed. A graph of Rmax that has been normalized by the geometric mean of the zero-lag autocorrelation values for all spectrally shaped sequences is shown is FIG. 7. FIG. 7 illustrates an effective way to display the maximum overall crosstalk between sequences. To facilitate separation, it is desirable to minimize crosstalk at least over a time window when arrivals from reflectors are expected. Because the cross-correlation operation was performed in the frequency domain, there is a wrap-around effect evident in FIG. 7. Zero padding of the record, done to avoid aliasing, changed the original record length firm 50 seconds to about 131 seconds before the FFTs were performed. Correlation in the frequency domain is just a multiplication at each frequency increment of the spectral component from one sequence with the complex conjugate of the spectral component from a second sequence. The IFFT of the resultant array transforms the result back to the time domain. With this method, values that correspond to lags greater than half the padded record length actually correspond to negative lags or negative time (or time prior to the zero lag). In the example, the period from about 131 seconds back to 123 seconds would correspond to values for the time interval of 0 to −8 seconds. Small Rmax values (maximum cross-correlation values) over the interval of ±8 seconds are desirable for good separation when an eight second listen time is required.

Step 506, windowing in the time domain, is next. A window function (or apodization function) is a function that is zero-valued outside of some chosen interval. The window function will generally be of unit value at least over the time interval corresponding to twice the listen time. For the example case, this corresponds to ±8 seconds centered about zero lag. As has been mentioned, because of the wrap-around effect often encountered when FFT methods are used for correlation, the negative time (0 to −8 seconds) may appear in the wrap-around region, for example (131 seconds to 123 seconds). The window function then tapers off smoothly in both positive and negative time down to a zero value over a brief transition band. For this example, a transition period of 2 seconds on either side is chosen. The taper function can be a cosine taper to form a window function known in the art as a Tukey window. The various autocorrelation and cross-correlations formed in step 504 are multiplied by the corresponding time elements of the window function. The net effect of the window operation is that all auto-correlation and cross-correlation values that fall outside the window are set to zero and those correlation values that fall inside the time period of interest, typically twice the listen time (±8 seconds for example), are unaltered. Additionally, those correlation values that fall inside the transition band are weighted by the taper function to make a smooth transition to zero.

The reason for choosing a time interval window that is slightly greater than twice the listen time is now explained. First consider the case of an early reflection event. Crosstalk artifacts that fall after an early reflection event must be minimized so that late arrivals within the listen period are not masked. Similarly, crosstalk artifacts for strong late arrivals that are received near the end of the listen time must be minimized so that weak reflection events that fall earlier in the record are not masked. Thus it becomes apparent how the width of the window of interest is defined.

To improve matters the independent portion of each sweep is extracted. The spectrally-shaped sweeps (SA, SB, SC and SD) can be represented in the frequency domain as follows:

$$F\{SA\}=F\{A\}+F\{r_1\}F\{B\}+F\{r_2\}F\{C\}+F\{r_3\}F\{D\}$$

$$F\{SB\}=F\{B\}+F\{r_4\}F\{A\}+F\{r_5\}F\{C\}+F\{r_6\}F\{D\}$$

$$F\{SC\}=F\{C\}+F\{r_7\}F\{A\}+F\{r_8\}F\{B\}+F\{r_9\}F\{D\}$$

$$F\{SD\}=F\{D\}+F\{r_{10}\}F\{A\}+F\{r_{11}\}F\{B\}+F\{r_{12}\}F\{C\}$$

The four sweeps listed above can be thought of as time series type sequences or because the math is simpler for us we work with Fourier transformed representations in the frequency domain designated by the operator F { }. Note each of the sweeps is composed of an independent source (A, B, C or D) plus some additional terms we want to remove that contain information about the crosstalk between the spectrally-shaped sweeps. For example $r_1$ represents the transfer function that when convolved with B results in that portion of SA that is correlated with independent source B. The term independent source is loosely applied here; we mean that over a time window of interest these components are mutually uncorrelated. The objective is to extract A, B, C and D from the initial sweeps.

In step 507, an approximate solution for the first sweep A that is representative of the form of the solution for all the sweeps is:

$$F\{A\}\approx F\{SA\}-\beta(\delta_1)$$

where:

$$\delta_1=F\{R(SA,SB)\}/F\{R(SB,SB)\}F\{SB\}+F\{R(SA,SC)\}/F\{R(SC,SC)\}F\{SC\}+F\{R(SA,SD)\}/F\{R(SD,SD)\}F\{SD\}$$

and β is a constant less than one. Experience has shown that a value of 0.7 for β facilitates good performance of the algorithm for this application. The approximate solution relies on the fact that the starting sequences are weakly correlated and that the starting sequences can be substituted in the solution. For example F{SB} can be used in place of the unknown quantity F{B} in the expression for $\delta_1$. The function R(X, Y) represents a cross-correlation of two sequences, X and Y, that has been windowed in the time domain to retain lag values over the region from twice the listen time.

After the decoupling process is complete, step 508 performers the same spectral shaping filter algorithm described in step 503 on the sweeps to help fill in any deep notches that might result from decoupling.

After step 508, step 509 performs level compression to increase the ratio of output power to peak power. (Level compression is sometimes referred to as "soft limiting"). For example, in the audio industry level compression is used to make sounds louder without exceeding a preset peak voltage. The idea is to avoid overdriving speakers or causing amplifiers to clip. There are similar concerns in analysis of seismic data. The goal is to generate as much seismic energy as possible without exceeding the static hold down force that has been applied to keep the base plate in good contact with the ground. Since the vibrators will have different sweeps, they will act as independent point sources, and the resulting emissions will not combine as they might in conventional seismic where all vibrators execute the same sweep. There is a need for good signal-to-noise ratio and one method of improving signal-to-noise ratio is by boosting the source overall output power. For example, consider a unit amplitude square wave having the same peak amplitude as a sine wave. The square wave will have RMS amplitude of 1 while the sine wave will have RMS amplitude of about 0.7071. The power in the square wave is twice that of the sine wave. The action of the sweep decoupling process has been found to reduce the overall RMS content of the sweep. Level compression provides a means to restore some of that energy. A function useful for level compression is:

Compress(y)=sin {y(π/2)} for −1<y<1; and sign(y) elsewhere.

With y=η(x/σ), x being the instantaneous input value. σ being the standard deviation (or RMS value) of the entire sweep sequence to be level compressed and η a constant parameter selected to determine the amount of compression, for example η=0.5. The function sign ( ) has a value of −1 for numbers less than zero and a value of +1 numbers greater than zero. Because compression is a nonlinear operation, spectral components above the highest sweep frequency of interest are produced. This high frequency noise is then filtered in step 510 using a high cut filter of the form described earlier as the function $g_2$. An optional step that is not shown is the application of a short taper function (for example, 200 milliseconds in length) at the start and end of the sweep. The taper function allows the sweep drive level to ramp up at the start of the sweep and then ramp down to zero amplitude at the end. The practice of tapering is more important when conventional up-sweeps or down-sweeps are employed, since for those sweep types tapering provides a means to produce a smooth spectral window and thereby mitigate problems associated with Gibbs phenomenon. Because the modified sweeps of this embodiment have already been spectrally shaped with a smooth roll-off in the frequency domain, tapering is really unnecessary; however some users feel that sweeps modified by a taper are easier on the equipment.

Next, the modified sweeps need to be cross-correlated in step 511 as described above in step 504 and the results displayed in step 512 to measure the crosstalk between the sweeps. A display produced using the function Rmax is employed again to quantity the degree of crosstalk so that decision 513 can be made to determine if another iteration in the sweep modification procedure will be required. Typically, ten to twenty passes are usually required to drive crosstalk down to acceptable levels. If an acceptable level of crosstalk is achieved, the process proceeds to step 514, otherwise the process returns to step 502.

Figure 8A:
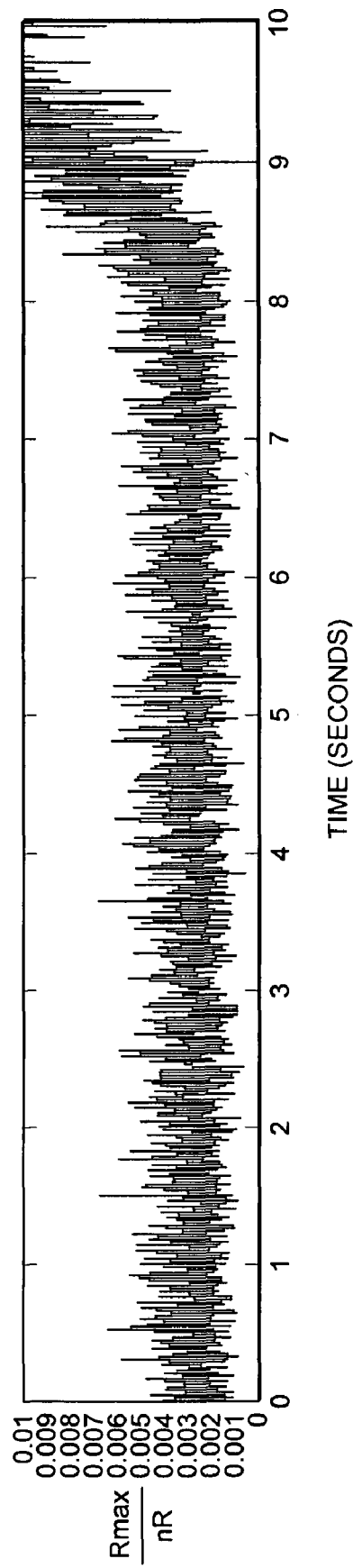
FIG. 8A illustrates an enlarged view of the normalized Rmax values computed at each lag after sixteen iterations of sweep modification over the time window of interest.
Figure 8B:
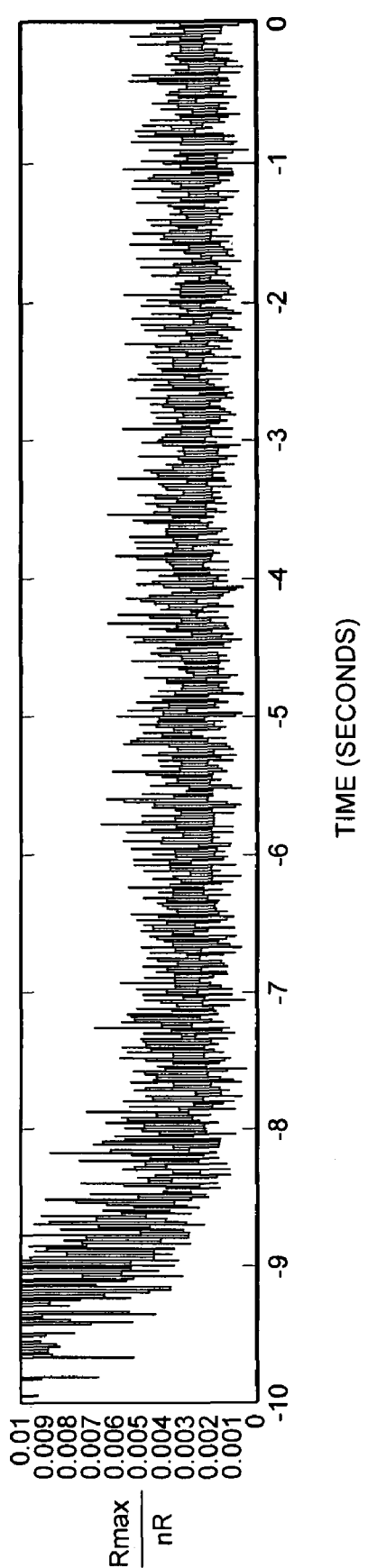
FIG. 8B illustrates an enlarged view of the normalized Rmax values computed at each lag after sixteen iterations of sweep modification over the time window of interest.
Figure 9:
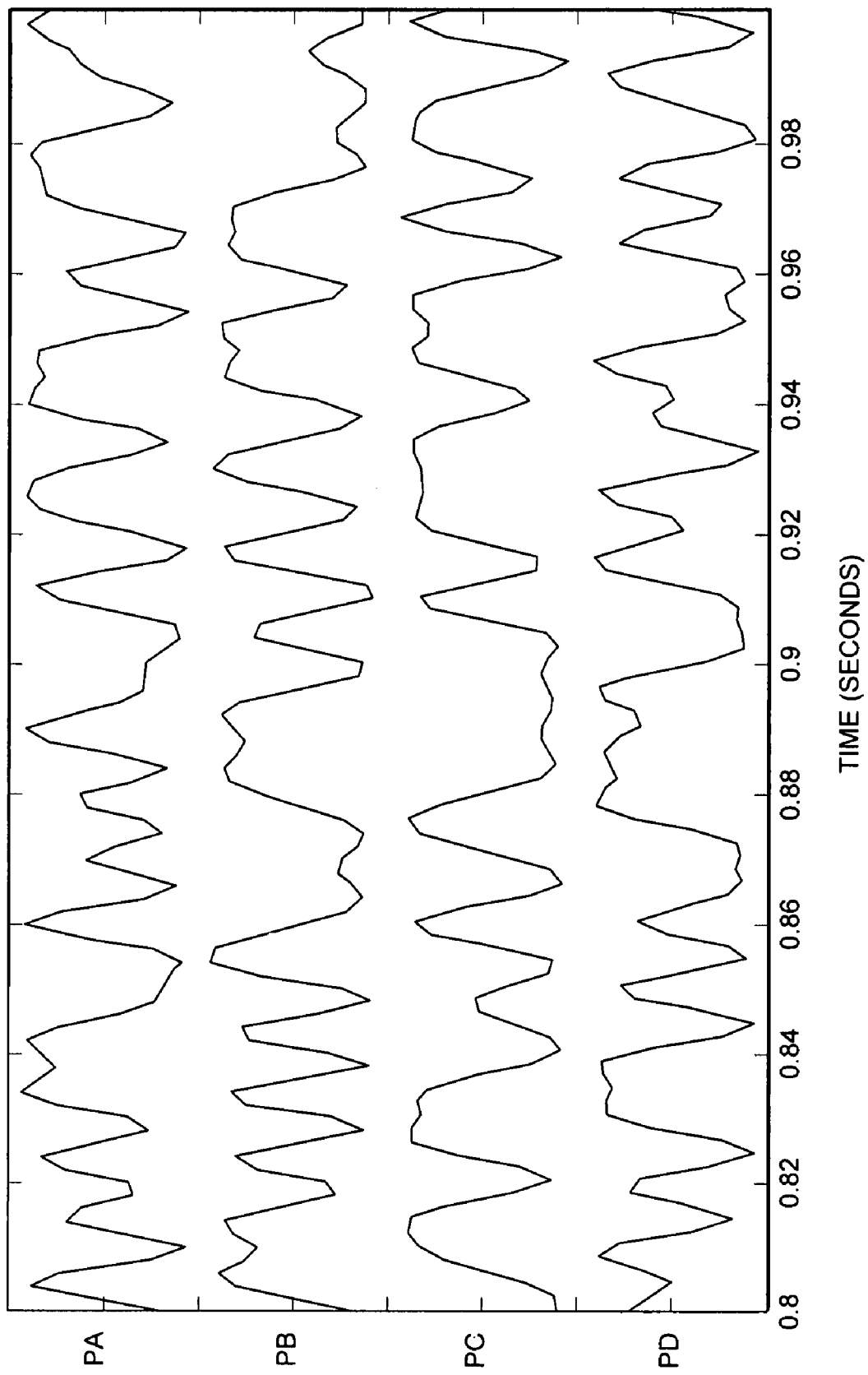
FIG. 9 illustrates the modified pseudorandom sweep sequences.

FIG. 8A and FIG. 8B are enlarged displays of the maximum level of crosstalk measured between the four modified sweeps after sixteen passes through the sweep modification procedure. Only values of Rmax are shown over the "window of interest" and the portions corresponding to both positive and negative time are shown separately. In this case, the maximum cross talk over the ±8 second window of interest is 0.007 or −43 dB and is generally less. A comparison of FIG. 7 and FIG. 8 shows that the sweep modification process has significantly reduced the pilot sweep crosstalk. FIG. 9 shows the decoupled pilot signals PA, PB, PC and PD of the four modified sweeps that were created after six passes through this procedure. Finally, because the vibrator electronics require that stored arbitrary waveforms be finely sampled at a prescribed rate, the modified sweeps will need to be re-sampled in step 514. For example, crews equipped with SERCEL model VE 432 vibrator electronics must re-sample the modified sweeps to a 500 µs interval. For survey crews equipped with PELTON model VIB PRO electronics, the required sample interval is 250 µs. A digital interpolation filter can be used to facilitate the re-sampling operation. The modified pilot sweeps can then be transferred or downloaded into both the recording equipment for use later as a correlation operator and also in the vibrator electronics for sweep generation. For some vibrator controllers that do not offer a means for closed-loop control of pseudorandom sweeps, it may be desirable to include one other step to construct a suitable drive signal. A matching filter can be designed beforehand to help compensate for the open-loop response of the vibrator. The natural open-loop response of the vibrator is similar to that of a band-pass filter, with a resonant point that falls near the middle of the seismic band where the frequency amplitude response is at its peak, and whose frequency response rolls off as you move above or below the resonant frequency. The matching filter is constructed to compensate for this roll off, so that when combined with the vibrator's natural response the result is an overall spectrally flat response over the sweep frequencies of interest, so as to maximize output without exceeding the peak hold down force. Matching filters can also be formed to compensate the vibrator response to follow other target spectra. Moreover, corresponding phase compensation may be applied through this same matching filter, so that the desired waveform shape can be preserved to help preserve the RMS power of the waveform without exceeding a prescribed peak force. A digital matching filter can be designed, programmed and applied to the sequences on the same computer used to generate and modify the sweeps to form a set of drive signals that can be downloaded to the vibrator controllers if needed.

In the preferred embodiment, PRBS sequences and Gold codes were used as starting sequences for input to the sweep modification algorithm. Equivalent results have also been observed in simulation studies using other pseudorandom sequences, such as Gaussian noise, for input to the sweep modification routine (spectral shaping, decoupling and compression algorithm). The studies showed that after a number of passes through the sweep modification routine, these modified sequences also exhibit about the same low Rmax levels as the modified PRBS sequences. In these simulation studies, the separation noise produced by these other types of pseudorandom sequences was found to be approximately the same as for the modified PRBS sequences.

Data Acquisition

After the modified sweeps have been downloaded into the memory of both the recording system-processing unit and the vibrator control electronics, each vibrator controller contains its unique modified weakly correlated sweep. Referring again to FIG. 1, the control electronics for 110 would contain the modified sweep derived from Sequence A, 111 would contain the modified sweep derived from Sequence B, and so on.

With the vibrators positioned at a source location, a start command is initiated via a radio link. The recording truck can initiate this start command when the acquisition system is ready for the next record, or after the recorder has received some form of handshake from the vibrators that they are in position. After receiving the start command, each unit 110, 111, 112, and 113 executes its respective modified weakly correlated sweep. Vibrators 110, 111, 112, and 113 vibrate and seismic energy is radiated into the earth. At the same time at least one measured signal is recorded for each vibrator that is representative of, the energy it has produced and that is propagating into the earth. Receivers 120, 121, 122, 123, and 124 are linked to the recording system and they receive the source energy after it has propagated through the earth, where the subterranean geologic features have affected it (represented by transfer functions 130, 131, 132, and 133 for receiver 120). The overall record length is the sweep length plus the listen time. For example, with a 50-second sweep length and eight-second listen time the record length would be 58 seconds. All recorded signals pass through some form of low pass anti-alias filter and the data is sampled and converted to a digital format through means of an analog-to-digital converter. Following conservative guidelines (sample rate is four-times the maximum frequency to be recovered), the signals for this example would be sampled at a 2-millisecond interval, since energy at or slightly above 100 Hz is to be recovered. In theory, the Nyquist sampling rate of twice the highest frequency to be recovered is all that should be required, but to ensure no spectral aliasing of the data some safety margin is usually observed resulting in the four-times rule. Anti-alias filters generally require some bandwidth to roll-off and are not brick-wall filters, so spectral room is required to allow for adequate attenuation of very high frequencies that might be present in the raw signal.

Typically, most modern recorders are equipped with a facility to perform correlation. The recording system operator has the option of recording the uncorrelated record, and/or correlating the record in the field and storing those results. The advantage to performing field correlation is that by analyzing results as the data is collected, problems can be identified and resolved early, thereby ensuring quality data. This also provides an opportunity to reevaluate and make adjustments to the survey parameters based upon any new information that has been gathered. Since the receiver signals are composite signals received from the four vibratory sources and it is desirable to correlate in the field to obtain an intermediate result (preliminary separation), the field processing unit will need to correlate the data set four times, once for each source. The correlation operation compresses the data so that typically only that portion of the correlated record after the zero lag, but before the lag corresponding to the listen time length, is retained. For our example, this might mean only about eight seconds of correlated data would be retained for each of the four derivative correlated records. For this preferred embodiment, the field correlation as just described would only be used for quality control purposes. Generally, uncorrelated data is required for implementation of enhanced separation and source signature removal; however, field correlated records could be used as an input for enhanced separation. If field correlated records are used, they will need to include both positive and negative time lag values that extend over at least twice the listen time.

Figure 12:
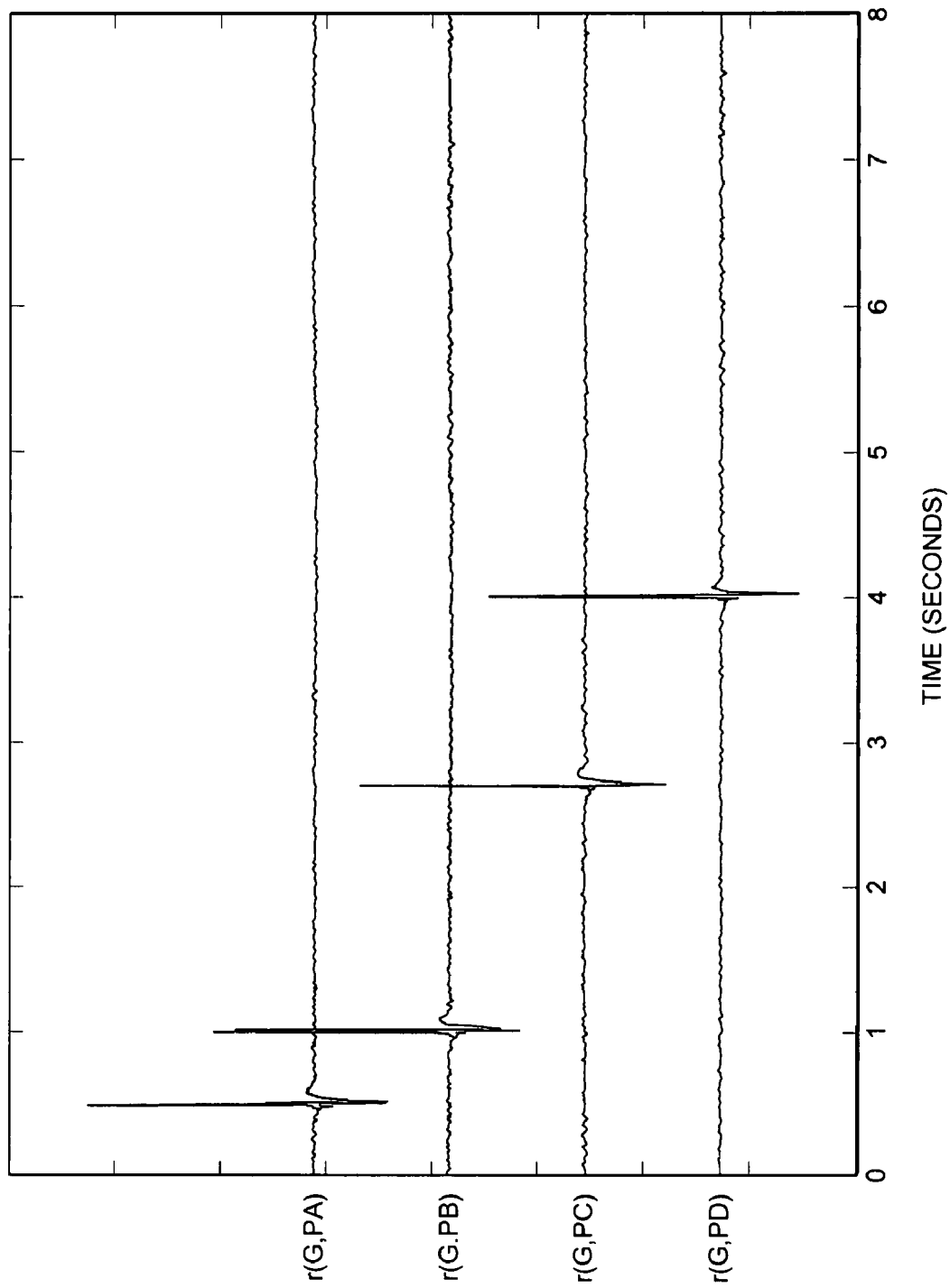
FIG. 12 illustrates a simulated composite received signal that has undergone intermediate separation by correlation with the various pilot sweeps.

FIG. 12 shows a simulated receiver signal that has been separated by correlation with the various pilot sweep signals (r(G,PA) denotes time-domain correlation between the composite receiver signal G and the decoupled pilot signal PA, etc). For this simple model, only one arrival from each source has been included. Also, some of the effects of harmonic distortion have been included in this simulation. To be explicit, the simulation assumed that the transmission path from the vibrators to the receiver had a band limited minimum phase response with half-power bandwidth corners at 5 Hz and 50 Hz rolling off at −12 dB/octave outside the pass band. The travel time from the source 110 to receiver 120 was assumed to be 0.5 seconds, 111 to 120 was 1.0 seconds, 112 to 120 was 2.7 seconds and 113 to 120 was 4.0 seconds. This very simple model assumed only one reflection event for each vibrator to geophone path. Quadratic and cubic nonlinear terms were used to distort the source outputs and some random noise was added to the source outputs.

For some situations, for example where high ambient noise is present, it may be desirable to execute multiple sweeps for each vibrator for the same source location. In this case, there is the option of combining multiple results from the execution of multiple sweeps for the same source location through a process called stacking. As has been explained earlier, stacking is essentially an averaging process. There are ways for dealing with this contingency, but they are not included as part of this preferred embodiment.

The survey moves from source location to source location as the vibrators are moved with sweep initiations at each location. With each new position another record is produced. The data acquisition process continues until the survey is completed.

At some point, the recordings are made available to the vibrator separation system 100. The recordings include not only the composite received signal data set, but also the recordings of the measured signals from each vibrator source.

Source Separation

Referring again to FIG. 1, consider the standard case where unique sweeps are generated simultaneously by four sources 110 through 113. The frequency domain representation of the composite recorded signal at receiver 120 for each frequency in the discrete Fourier transform is:

$$G = A\,hA + B\,hB + C\,hC + D\,hD + N$$

where the frequency subscripts are suppressed, G is the composite recorded frequency domain representation coefficient at the specified receiver, A is the source vibration coefficient for the specified frequency as measured at vibrator 110, B is the source vibration coefficient for the specified frequency as measured at vibrator 111, and so on. For clarity, A, B, C and D are frequency domain representations of the measured source signals. In addition, the contribution of noise to the sweep is included in the equation and represented by the term N. Each coefficient is a complex number. The terms G, A, B, C and D are known: we seek a solution for the transfer functions hA, hB, hC and hD, labeled as 130 through 133 in FIG. 1.

Initially, it appears that there is one equation with four unknowns for each frequency. However, recall that a great deal of effort has been expended to carefully construct the source sweeps so that they are approximately orthogonal over a time window of interest. Another way of thinking about this is that there is a time window over which the spectral contribution by each source is unique and/or the spectral contributions from each source do not overlap temporally. Therefore after correlation with the various pilot sweeps followed by windowing we obtain this system of equations for each frequency (the index is implied but not shown):

$$R(G,PA) = R(A,PA)hA + R(B,PA)hB + R(C,PA)hC + R(D,PA)hD + NA$$

$$R(G,PB) = R(A,PB)hA + R(B,PB)hB + R(C,PB)hC + R(D,PB)hD + NB$$

$$R(G,PC) = R(A,PC)hA + R(B,PC)hB + R(C,PC)hC + R(D,PC)hD + NC$$

$$R(G,PD) = R(A,PD)hA + R(B,PD)hB + R(C,PD)hC + R(D,PD)hD + ND$$

where the function R(X, Y) is a frequency domain representation of the time windowed correlation of X with Y. NA, NB, NC and ND are the frequency domain representations of the noise term N after correlation with the various pilots.

While the particular embodiments of this invention have been described using conventional correlation with the source pilot signals, those skilled in the art will recognize that other options are possible. For example, digitally altered versions of the source pilot signal can also be used as correlation operators. Two examples include (1) alteration of the pilot amplitude spectrum and (2) alteration of the pilot phase spectrum. Since the correlation can be done over a selected range of frequencies in the frequency domain, the amplitude information in the FFT of the source pilot could be discarded and only the phase information retained to create a spectrally flat amplitude correlation operator. The perceived advantage of this would be that the correlated data (1) is not colored by the pilot spectrum and (2) the correlated data more accurately matches the actual source output spectrum. Additionally, a minimum phase vibroseis correlation, instead of conventional correlation, with a pilot sweep whose phase spectrum has been modified to yield minimum-phase wavelets that have the same amplitude spectrum as the original pilot sweep's autocorrelation function could be utilized. Thus, "correlation with the source pilot signals" applies not only to conventional correlation but also to correlation with operators that are derivatives of the source pilot signals.

Next, we consider the over-determined case. The standard case utilizes one sweep per shot location; however in a noisy environment, the choice of using a longer sweep may not be an option. An alternative would be to use multiple (two or more) sweeps for each shot record. Consider, for example, that two sweeps per source location are utilized. G1 (implied frequency increment) represents the composite received signal at receiver 120 for the first sweep initiation and G2 the composite received signal at receiver 120 for the second sweep initiation. For this example, 110 generates vibrator signal energy represented by A1 for the first sweep initiation and A2 for the second sweep initiation. This same indexing scheme is used to represent the actions of the other sources. A1 and A2 may represent the same sweep being executed twice or they may be different sweeps. For example, A1 and A2 may be designed and modified from different parent PRBS, formed from different positions within the same parent sequences, A2 may be a time-reversed version of A1, the second suite of sweeps may be generated using different Gold codes derived from the same parent sequences, or even polarity reversed copies of the first sweep (A2=−A1, B2=−B1, . . . ). There are many possibilities. In addition, the contribution of noise to the sweeps is included in the equation and represented by the term N1 for the first recording and N2 for the second recording. Again, the frequency increment is implied.

$$G1 = A1hA + B1hB + C1hC + D1hD + N1$$

$$G2 = A2hA + B2hB + C2hC + D2hD + N2$$

For the over-determined case, the two records are correlated with their respective suite of pilot sweeps used for that particular sweep record. The correlated record after windowing can be represented in the frequency domain by the following system of equations for each frequency increment. The frequency increment is implied for this set of equations:

$$R(G1,PA1) = R(A1,PA1)hA + R(B1,PA1)hB + R(C1,PA1)hC + R(D1,PA1)hD + NA1$$

$$R(G1,PB1) = R(A1,PB1)hA + R(B1,PB1)hB + R(C1,PB1)hC + R(D1,PB1)hD + NB1$$

$$R(G1,PC1) = R(A1,PC1)hA + R(B1,PC1)hB + R(C1,PC1)hC + R(D1,PC1)hD + NC1$$

$$R(G1,PD1) = R(A1,PD1)hA + R(B1,PD1)hB + R(C1,PD1)hC + R(D1,PD1)hD + ND1$$

$$R(G2,PA2) = R(A2,PA2)hA + R(B2,PA2)hB + R(C2,PA2)hC + R(D2,PA2)hD + NA2$$

$$R(G2,PB2) = R(A2,PB2)hA + R(B2,PB2)hB + R(C2,PB2)hC + R(D2,PB2)hD + NB2$$

$$R(G2,PC2) = R(A2,PC2)hA + R(B2,PC2)hB + R(C2,PC2)hC + R(D2,PC2)hD + NC2$$

$$R(G2,PD2) = R(A2,PD2)hA + R(B2,PD2)hB + R(C2,PD2)hC + R(D2,PD2)hD + ND2$$

where, as before, the function R(X, Y) is a frequency domain representation of the time windowed correlation of X with Y.

The system of equations for either the standard case or the over-determined case may be represented in matrix form:

$$\mathcal{R}_i = S_i \mathcal{H}_i + \mathcal{N}_i$$

where $\mathcal{R}$ is a column vector containing the elements R(G, PA) . . . R(G, PD), $\mathcal{H}$ is a column vector containing the elements hA . . . hD, $\mathcal{N}$ is a column vector containing the noise elements, and S, for the standard case, is a square matrix whose elements contain the cross-correlation of the measured source signals with the various pilots. For the over-determined case, S will contain more rows than columns because the number of equations exceeds the number of source-to-receiver paths. S will hereinafter be referred to as the source cross-spectral density matrix and contains information about any interdependent relationship of the four sources. For the standard case, if the four sources were perfectly orthogonal with respect to one another, S would become a diagonal matrix with the off diagonal terms that are representative of the crosstalk being zero. In reality, this is not the case for a variety of reasons, chief among them being that the sweeps themselves are not perfectly orthogonal and the vibrator source adds harmonic distortion to the process.

The optimal least-squares filter solution (Weiner-Kolmogorov filter) in the frequency domain for the case where the noise term is uncorrelated with the source signal is of the form:

$$\mathcal{H}_i = [S^T_i S_i + \mathcal{N}^T_i \mathcal{N}_i]^{-1} [S^T_i \mathcal{R}_i]$$

Since the elements of the various arrays are complex numbers the symbol "$T$" represents the conjugate transpose operator. The matrix $[S^T S]$ is a square matrix called the grammian and its elements are purely real. The matrix $[\mathcal{N}_i \mathcal{N}_i]$ represents the noise term. The source separation matrix, $\mathcal{W}$, is defined as:

$$\mathcal{W} = [S^T_i S_i + \mathcal{N}^T_i \mathcal{N}_i]^{-1} [S^T_i]$$

After substitution, the solution for the earth transfer function vector can be rewritten as:

$$\mathcal{H}_i = \mathcal{W}_i \mathcal{R}_i$$

The noise spectrum $\mathcal{N}$ can be flat, tilted, smoothly varying, etc. as long as a reasonable guess can be made as to its spectral shape. Experience has shown that in most cases, good separation can be achieved using a spectrally flat estimate of the noise. Typically the level of the pre-whitening noise is set to a fraction of the average power in the measured source signal. A typical range of pre-whitening levels, for example, is about one-tenth of one percent (0.1%) to about one percent (1.0%). This is mathematically represented as follows:

$$\mathcal{N}^T_i \mathcal{N}_i = \varepsilon \mathcal{U},$$

where (for a pre-whitening of 1% )

$$\varepsilon = 0.01 \left( \frac{\sum_{n=n_1}^{n_2} \text{trace}(S^T_n S_n)/(n_2 - n_1)}{Nsources} \right)$$

$\mathcal{U}$ is the unitary or identity matrix;

Nsources represents the number of sources used (number of columns in the matrix); and $n_1$ and $n_2$ correspond to the lowest and highest discrete frequencies of interest.

The trace operator produces the sum of the principal diagonal elements of a square matrix. For this case, the trace is the sum of the principal diagonal elements of the grammian. The added noise term effectively acts to stabilize the solution for frequencies that generally fall outside the band of interest where the set of equations may otherwise be ill-conditioned.

Figure 10:
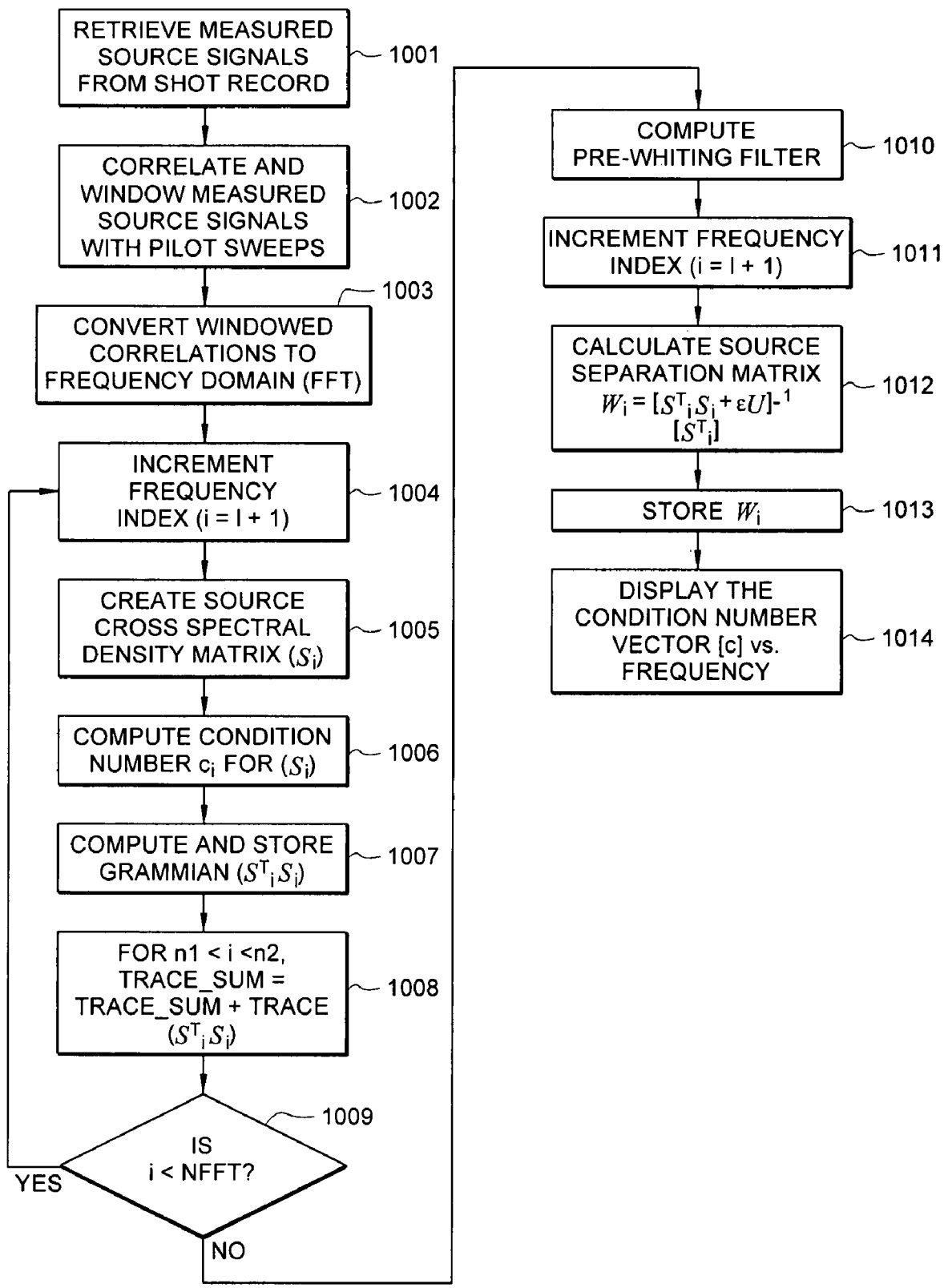
FIG. 10 is a flowchart showing how the source separation matrix is formed.
Figure 13:
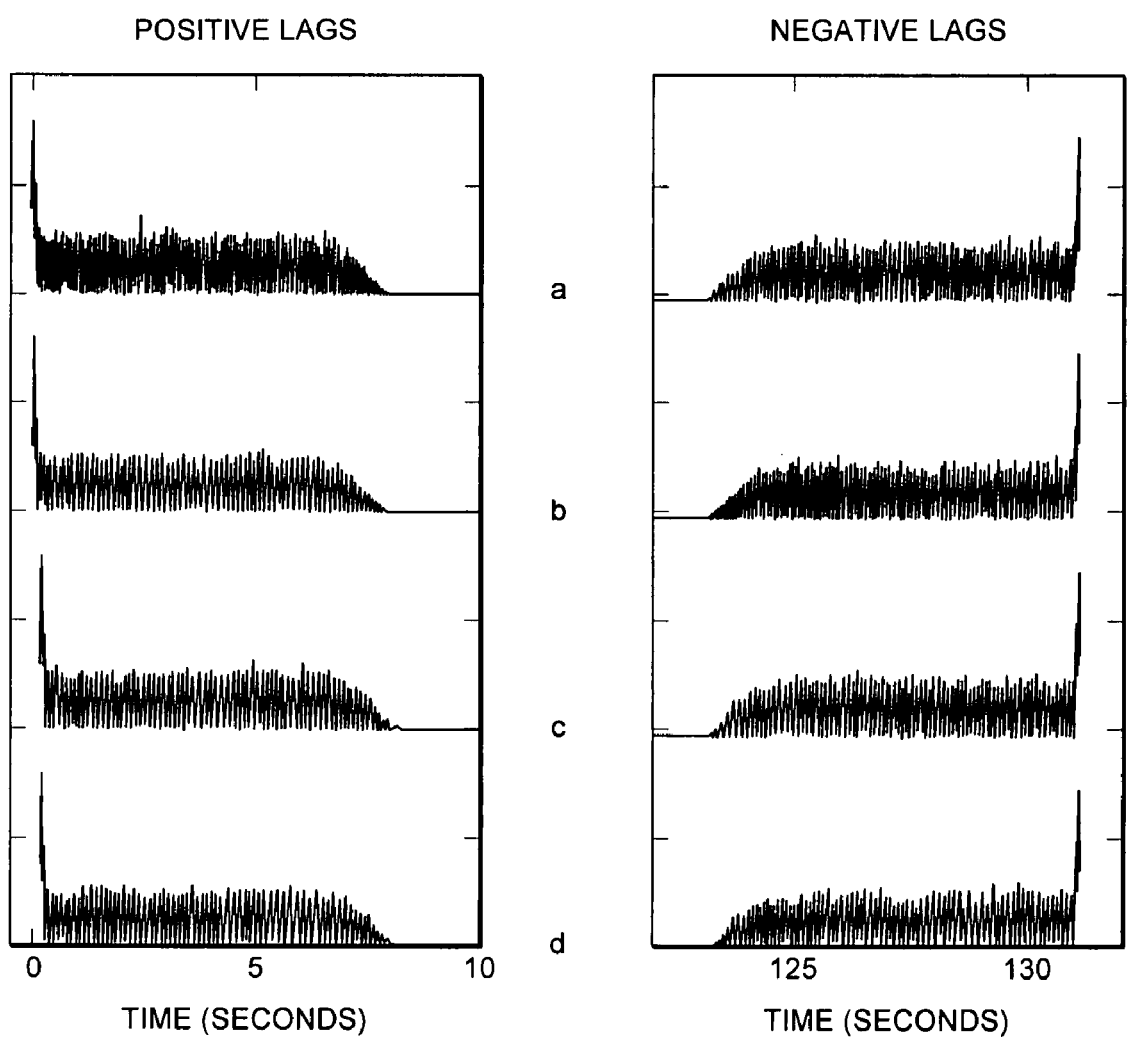
FIG. 13 illustrates a set of four simulated source measurements that have been correlated with their respective pilots and windowed.
Figure 14:
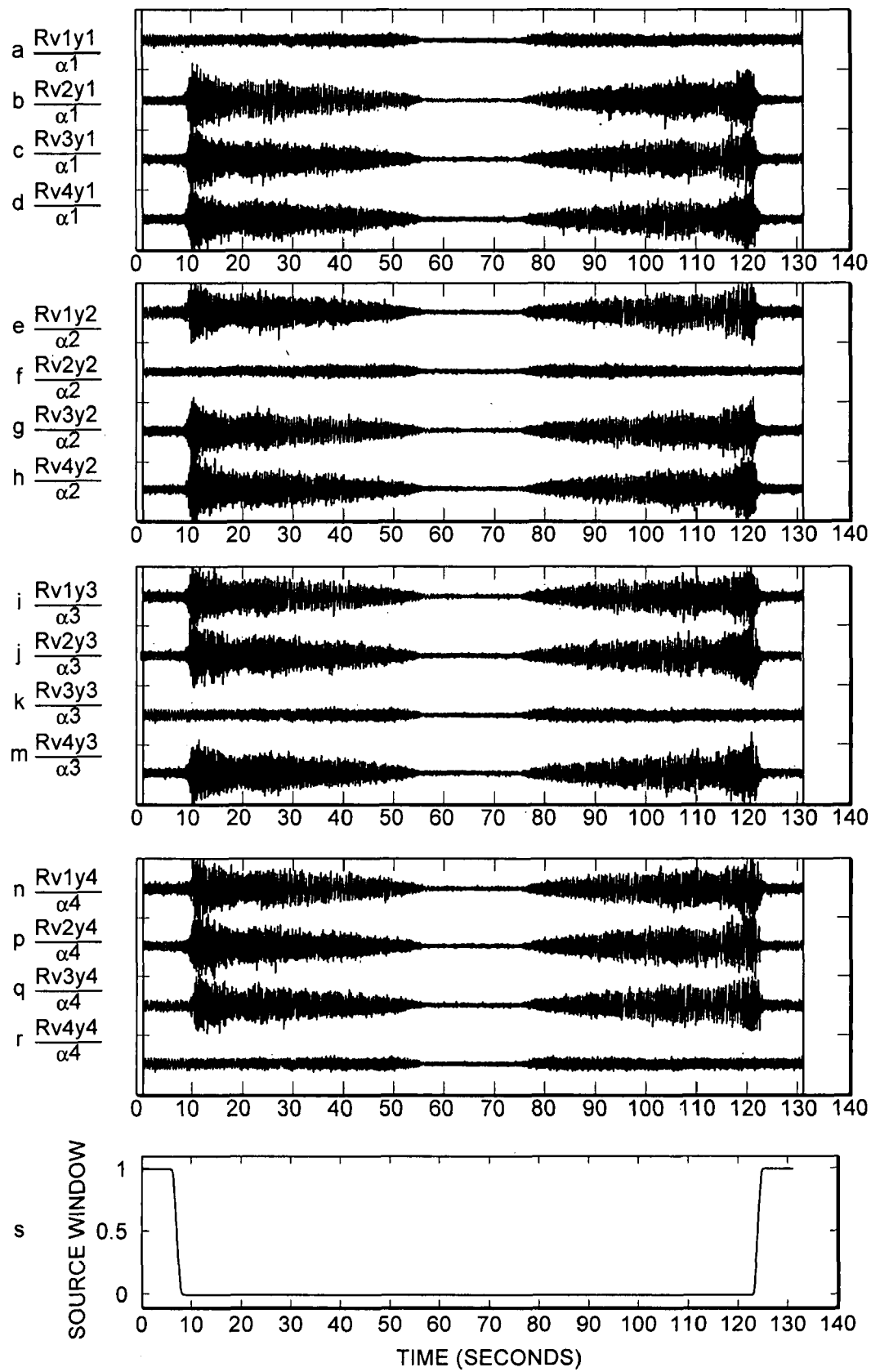
FIG. 14 is an enlarged view of the cross-correlation waveforms obtained from the simulation.

Turning now to FIG. 10, a flow chart describing the various steps involved in forming the source cross-spectral density matrix S and its inverse, the source separation matrix $\mathcal{W}$, are shown. This process will be applied once for each source location record. For convenience, we will describe the method of FIG. 10 in reference to the example described above. First the measured source signals A, B, C, and D are retrieved in step 1001. Each source signal is then cross-correlated with each pilot sweep signal PA, PB, PC and PD in step 1002. FIG. 12 shows results from a simulation where each source has been correlated with its corresponding pilot over the listen time, i.e. A is correlated with PA, B is correlated with PB and so on. Note, the source model is nonlinear and so some of the effects of harmonic distortion and other noise have been incorporated into this simulation. FIG. 14 shows results from a simulation where each measured source signal has been correlated with every pilot sweep, i.e. A is correlated with PA, PB, PC and PD, B is correlated with PA, PB, PC and PD, and so on followed by windowing. A source signature window, with width sufficient to cover twice the listen time and extending into both positive and negative time, is centered on the zero lag time. Additionally, the source signature window is smoothly tapered at its edges to avoid any sharp corners that might produce unwanted artifacts. FIG. 13 shows the measured source signals that have been correlated with their respective pilot sweeps and then windowed. In FIG. 13, logarithmic amplitude for each source is displayed for both positive and negative lags with "a" corresponding to the cross-correlation of measured source signal A with pilot sweep PA, "b" corresponding to the correlation of measured source signal B with PB, and so on. When the source signature window is applied in the time domain to the various source cross-correlations with the various pilot sweeps, values that lie outside this window are set to zero and the window is gently tapered to avoid abrupt corners. FIG. 14 shows the results of cross correlating each measured signal with each pilot sweep before the source signature window has been applied. The source window function is labeled "s" in FIG. 14. Specifically for FIG. 14, the waveform labeled "a" represents the correlation of measured signal A with PA, the waveform labeled "b" represents the correlation signal B with PA, "c" labels signal C correlated with PA "d" labels signal D correlated with PA, "e" labels signal B with PA, "f" labels signal B with PB, and so on. All displays are normalized by zero lag autocorrelation values; for example, the correlation in plot "a" is normalized by $\alpha 1$, the zero lag autocorrelation of PA As can be seen in FIG. 14 there is a quiet zone in the cross-correlations corresponding to the region that has been decoupled, and that same time interval falls inside the source signature window. Also in FIG. 14, waveforms labeled "a", "f", "k" and "r" are the same waveforms shown earlier in FIG. 13; however, because the scale is enlarged vertically, their zero lag values are clipped in this display. Next, in step 1003, an FFT for each windowed source cross-correlation is calculated and results stored. Next, steps 1004 through 1009 calculate and store the matrix $\mathcal{W}$ for each frequency. The elements of S are formed from the FFT values stored in step 1003. Steps 1004 through 1009 from a computational loop whereby each frequency increment (step 1004) of the grammian $S^T_i S_i$ is calculated and stored in step 1007. The total source power over the frequency band of interest is also computed by summing the grammian trace values in step 1008. The elements of S are formed from the FFT values stored in step 1005 and in step 1006 and the condition number "$c_i$" (L2 norm) of the matrix $S_i$ is calculated and stored for display later. Source separation matrix formation is performed only once for each shot record. Steps 1004-1008 are repeated until all frequencies are evaluated in step 1009. Steps 1011-1013 form a second computational loop to compute the source separation matrix $\mathcal{W}$ for each frequency increment. For each frequency index in step 1011, the source separation matrix $\mathcal{W}$ of the form $$\mathcal{W}_i = [S^T_i S_i + \epsilon \, \mathcal{U}]^{-1} [S^T_i]$$

is computed in step 1012 and stored in step 1013. In step 1014, the vector of condition numbers is displayed vs frequency. Condition numbers provide an indication of the quality of the source separation for a given frequency. Condition numbers in excess of 10 may indicate problem frequencies or bad source performance and processing personnel may elect to discard the shot record.

Figure 11:
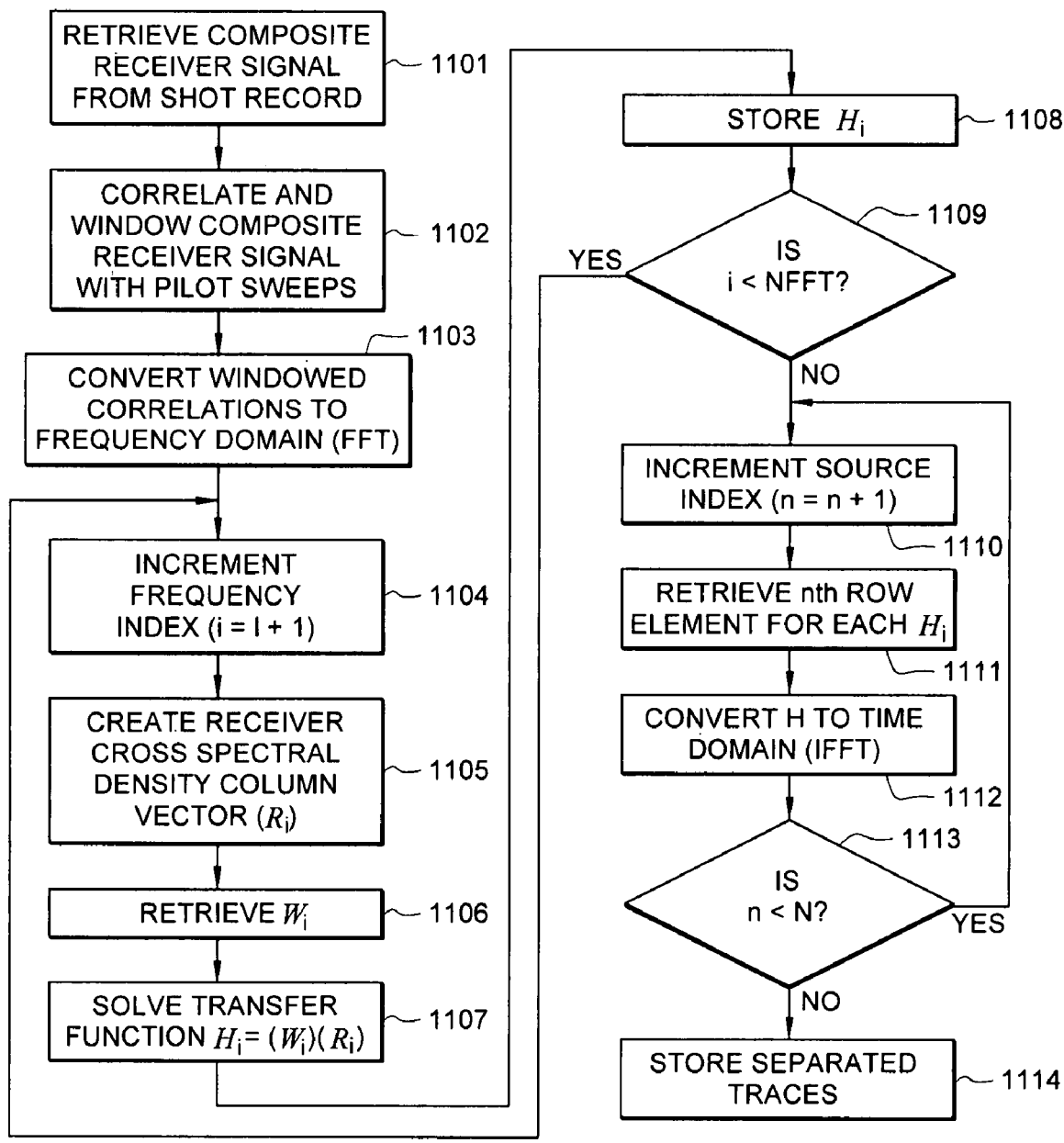
FIG. 11 is a flowchart showing the final separation process.
Figure 15:
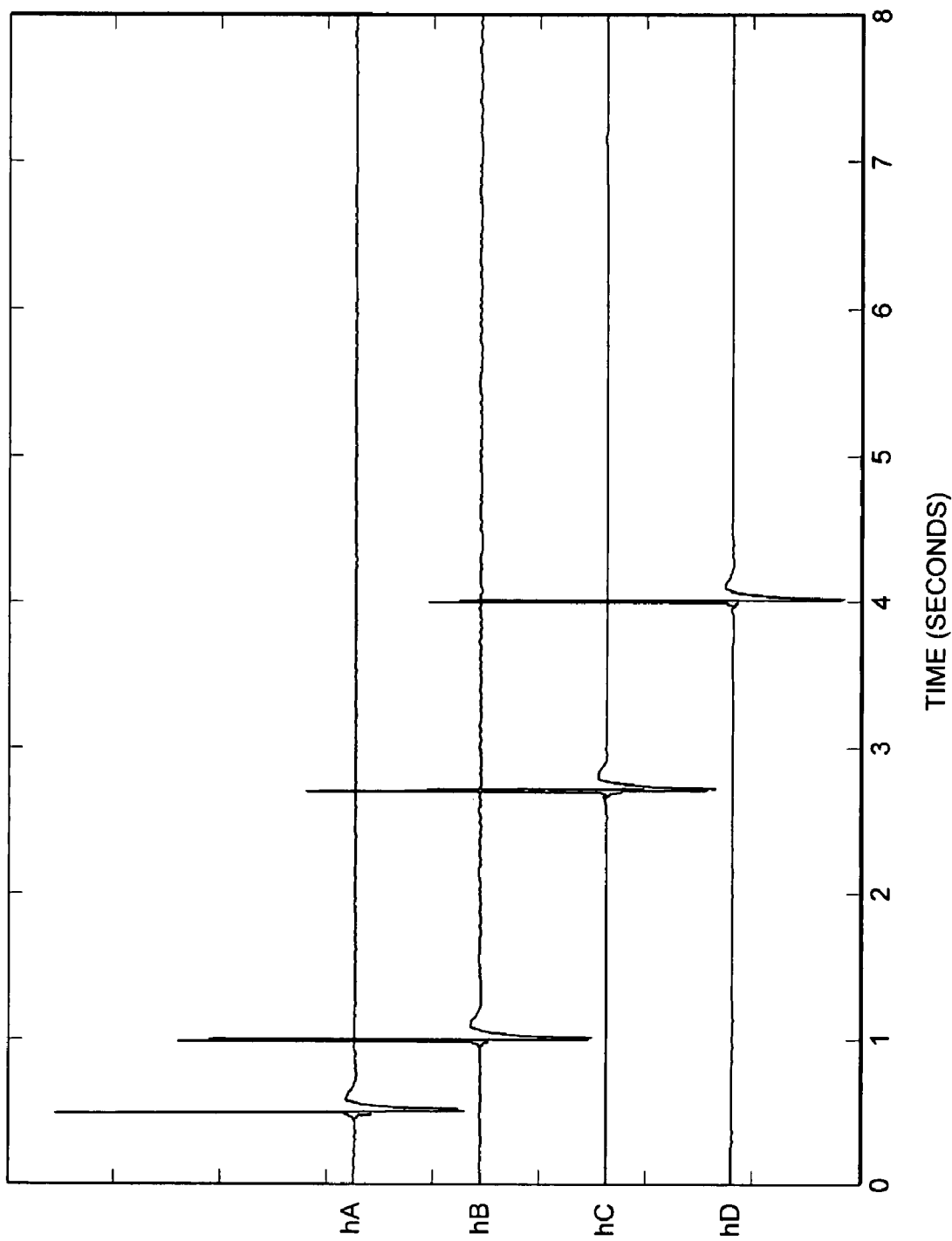
FIG. 15 illustrates the transfer function estimates after source measurement corrections have been applied for the simulation.
Figure 16A:
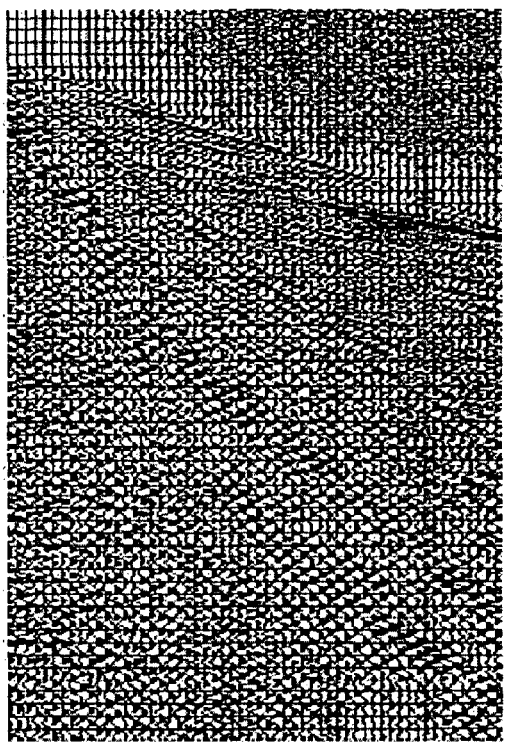
FIGS. 16A-16D illustrates a separated shot gathered from a field test using four vibrator sources.
Figure 16B:
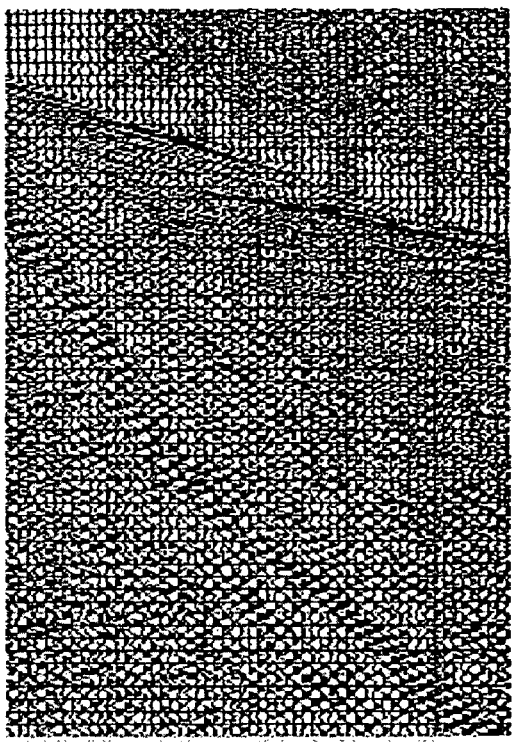
Figure 16C:
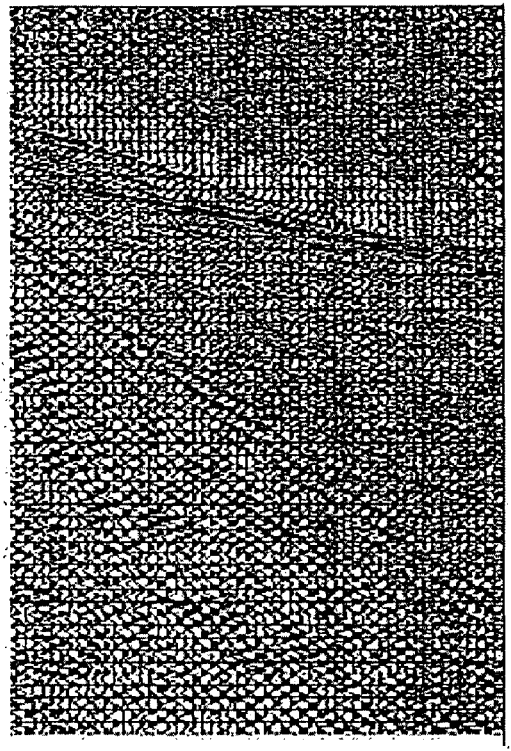
Figure 16D:
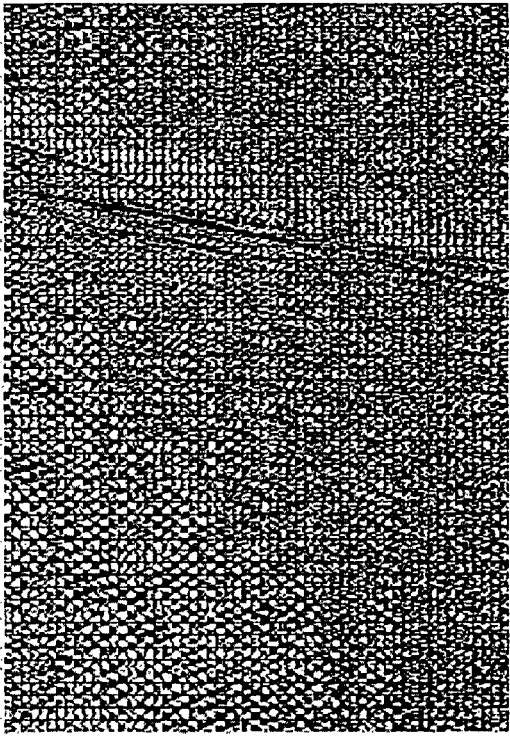

Turning now to FIG. 11, the next phase of the method is the actual separation process. This is basically a two-part separation. An initial separation by correlation followed by a second separation using the measured source signals that have been incorporated into formation of the source separation matrix $\mathcal{W}$ above. The second separation also includes source signature removal. This next phase of the method begins with retrieval of a composite received signal in step 1101. If the composite received signal has already been correlated in the field proceed to step 1103. If the data set is uncorrelated, the composite received signal is correlated with the pilot sweeps and windowed in step 1102. Again, FIG. 12 shows a simulation result after a single composite received signal has been correlated with each source pilot sweep signal. For our example, the signal composite received signal becomes four separated signals—this is an intermediate separation. A window is centered near the midpoint of the listen time that is wide enough to span at least the entire listen time. Correlated composite received signal data outside the window is zeroed out and the four windowed correlations are transformed into the frequency domain using an FFT and the results are stored in an array. Steps 1104 through 1109 of FIG. 11, illustrate a computational loop whereby at each frequency increment (index "i"), a receiver cross spectral density vector ("$\mathcal{R}$"), is formed and that vector $\mathcal{R}$ is then multiplied by its corresponding source separation matrix $\mathcal{W}$, the resultant being a vector $\mathcal{H}$ that contains the spectral representation of the fully separated composite received signal data at frequency increment "i". For the example case, the column vector $\mathcal{H}$ will have four rows. The first row element corresponding to the spectral component of the transmission path response (transfer function) from vibrator 110 to receiver 120, the second row element corresponding to the spectral component of the transmission path response from vibrator 111 to receiver 120, and so on. After the various transfer function estimates have been separated and estimated in the frequency domain, all of the first row elements of $\mathcal{H}$ are passed into an array and transformed back into the time domain using an IFFT with that result being transmission path response 130 for our example, all of the second row elements of $\mathcal{H}$ fare passed into an array and transformed back into the time domain using an IFFT with that result being transmission path response 131 for our example, and so on. At this point the separation process is complete for receiver 120 and the first shot record. The process illustrated in FIG. 11 is repeated for each receiver recorded for a particular shot. FIG. 15 shows the fully separated receiver data. For purposes of this discussion, the composite receiver signal can be taken to mean the recorded receiver signal affected only by the recording system filters or a modified version of that receiver signal that has gone through some form of ambient nose removal. Some common noise sources that might be mitigated in processing prior to separation might include, but not limited to, electromagnetic or vibrational interference from nearby transmission lines or transformers, noise bursts created by traffic along a nearby road or aircraft flying overhead, wind gust noise, pumping noises from pump jacks operating nearby or other oilfield machinery, and vibrational noise cause by fluid flow through nearby pipelines.

In FIGS. 16A-16D, the result of a field test of the method is shown. Four vibrator sources spaced approximately 500 meters apart were activated to each generate a unique weakly correlated PRBS sweep of the type herein disclosed. The separated contributions from each source are displayed as A, B, C and D. The receiver group spacing was 50 meters and a portion of the separated shot gather is shown for receiver stations offset from the sources. The time scale runs from top to bottom for each display with the maximum time corresponding to six-second travel time.

Other Applications and Embodiments

It is anticipated that other methods can be employed to solve the system of equations described above. Recall for example the equation from above $$\mathcal{R}_i = S_i \mathcal{H} + \mathcal{N}_i$$

For the standard case, where S is a square matrix and the noise term $\mathcal{N}$ is ignored, we can solve for $\mathcal{H}$ at each frequency.

$$\mathcal{H} = \{S_i\}^{-1} \mathcal{R}$$

or, $\mathcal{H} = \mathcal{W} \mathcal{R}$ where $\{\ \}^{-1}$ is used to denote the matrix inversion operator and $\mathcal{W}$ now equals the matrix inverse of S. If S is nonsingular its inverse exists; however, if S is singular or even ill conditioned, there is a strong interdependence at a particular frequency and attempts to separate the signals for that frequency may be unreliable. One method for handling ill-conditioned results would be to: 1) compute the matrix condition number of S for each frequency L2 norm); 2) if the condition number exceeds a predetermined threshold, then discard or attenuate in some fashion the separated result for that frequency. Such a method has been disclosed in U.S. Pat. No. 5,719,821. It is also anticipated that the use of condition numbers may be used in combination with the preferred embodiment shown above to select or alter the pre-whitening levels discussed above.

In the preferred embodiment, data acquisition and separation were designed to facilitate separation of the acquired data into contributions from individual sources thereby acquiring point source to receiver data sets. Under some circumstances, it may be desirable to acquire and separate multiple groups of vibrators. For example, consider the case where two groups of vibrators each comprised of three vibrators is employed. For this case, the vibrators in the first group execute sweep A, while the vibrators in the second group execute sweep B. For this case, the separation process would be equivalent to the separation of two vibrators, where the measured signal from a single vibrator would be replaced with the group measured signal. The "group measured signal" could be formed by combining (for example by means of arithmetic averaging) the measured outputs (for example ground force) from each individual source in that group.

This invention also has application to marine seismic surveys. In some cases marine vibrators are employed as sources (See e.g. U.S. Pat. No. 4,918,668) with multiple sources being towed by a marine vessel along with receivers contained in streamers. If it was desired to separate out the individual contributions of each source, a unique weakly correlated sweep could be designed for each marine source using the method described in the preferred embodiment for land. The marine vibrators would simultaneously execute their respective sweeps. The measured signal from each marine vibrator could come from a nearby hydrophone, a signal from an accelerometer mounted directly on a suitable vibrating face in contact with the water of the marine source or any other signal or combination of signals found suitable for representing the acoustic output of the marine source. The separation process would follow the same procedure as described in the preferred embodiment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of seismic prospecting comprising the steps of:
    selecting and generating a plurality of weakly correlated pseudorandom sequences;
    modifying the weakly correlated pseudorandom sequences to minimize crosstalk;
    generating source signals from the weakly correlated pseudorandom sequences; and,
    transmitting the source signals generated from the weakly correlated pseudorandom sequences to the earth.

2. The method of claim 1 further comprising the steps of:
    detecting and recording measured signals associated with each source;
    detecting and recording a composite received signal in response to the transmission of source signal through the earth; and,
    using the measured source signals to separate the transmission path response from the composite received signal.

3. The method of claim 1 wherein the step of generating a plurality of weakly correlated pseudorandom sequences further comprises a pseudorandom number generator.

4. The method of claim 3 wherein the pseudorandom number generator further comprises:
    selecting a preferred pair of sequences; and,
    combining the preferred pair of sequences using modulo-2 addition.

5. The method of claim 3 wherein the pseudorandom number generator further comprises:
    selecting a preferred pair of sequences;
    selecting a first parent sequence from the preferred pair of sequences;
    selecting a second parent sequence from the preferred pair of sequences;
    applying a delay to the second parent sequence;
    combining the first parent sequence and delayed second parent sequence using modulo-2 addition to generate a Gold code.

6. The method of claim 3 wherein the pseudorandom number generator comprises a linear feedback shift register.

7. The method of claim 3 wherein the pseudorandom number generator comprises a pseudorandom number generator algorithm.

8. The method of claim 3 wherein the pseudorandom number generator comprises a Gaussian noise random number generator.

9. The method of claim 3 wherein the pseudorandom number generator comprises a hardware random number generator.

10. The method of claim 1 wherein the step of modifying the plurality of weakly correlated pseudorandom sequences to minimize crosstalk further comprises:
    sampling the weakly correlated pseudorandom sequences;
    generating a target spectrum;
    reshaping the weakly correlated pseudorandom sequences by use of digital filtering;
    computing the autocorrelations of the sequences and the cross-correlations between the various weakly correlated pseudorandom sequences;
    windowing the autocorrelations of the sequences of the cross-correlations between the various weakly correlated pseudorandom sequences;
    decoupling the weakly correlated pseudorandom sequences;
    performing level compression of the weakly correlated pseudorandom sequences;
    filtering the weakly correlated pseudorandom sequences for high frequency noise;
    computing the autocorrelations of the sequences and the cross-correlations between the various weakly correlated pseudorandom sequences; and,
    resampling the weakly correlated pseudorandom sequences.

11. The method of claim 10, wherein the weakly correlated pseudorandom sequences are reshaped using the formula Target $(x)=g1(x)g2(x)$ where $g1(x)$ is $(x/F1)^2\{[1-(x/F1)^2]^2+[1.414*(x/F1)]^2\}^{-0.5}$ and $g2(x)$ is 1 for x less than or equal to F2 and is $\{[1+\cos((x-F2)/(F3-F2)*\pi)]/2\}^2$ for x between F2 and F3, zero for x greater than F3, and F1=5, F2=100, and F3=150.

12. The method of claim 10, wherein the weakly correlated pseudorandom sequences have bandwidths of about 10 Hz to about 100 Hz.

13. The method of claim 2, wherein the step of separating the source signals from the composite received signal further comprising:
    correlating measured source signals with source pilot signals;
    correlating the composite received signal with the source pilot signal;
    windowing the correlated data;
    Fourier transforming the correlated data from the time domain to the frequency domain;
    calculating the source separation matrix;
    creating a receiver cross spectral density column vector for each frequency;
    calculating the transfer function estimate by multiplying the receiver cross spectral density column vector by the source separation matrix; and,
    inverse Fourier transforming the transfer function back to the time domain.

14. A method of operating a plurality of seismic vibrators comprising the steps of:
    selecting and generating a plurality of weakly correlated pseudorandom sequences;
    modifying the weakly correlated pseudorandom sequences to minimize crosstalk;
    loading each vibrator with a unique weakly correlated pseudorandom sweep generated to minimize crosstalk;
    activating all vibrators and using at least one detector to detect and record the composite received signal from all vibrators; and,
    separating the composite received signal into individual transmission path estimates.

15. The method of claim 14 wherein the step of separating the composite received signal into individual transmission path estimates comprises:
    correlating and windowing said composite received signal with pilot sweeps;
    fast Fourier transforming the correlated and windowed composite received signals; and
    applying a source separation matrix.

16. The method of claim 14 wherein the step of separating the composite received signal into individual transmission path estimates comprises correlating the composite recorded signal with the source pilot signals.

17. The method. of claim 1. where the step of modifying the weakly correlated pseudorandom sequences to minimize crosstalk comprises decoupling a the weakly correlated pseudorandom sequences.

18. A method of operating a plurality of seismic vibrators comprising the steps of:
    sampling a plurality of sweep sequences;
    generating a target spectrum;
    reshaping the sequences by use of digital filtering;
    computing the autocorrelations of the sequences and the cross-correlations
    between the various sequences:
    decoupling the sequences;
    performing level compression of the sequences:
    filtering the sequences for high frequency noise;
    computing the autocorrelations of the sequences and the cross-correlations between the various sequences;
    resampling the sequences:
    loading each vibrator with a unique one of said resampled sequences; and activating all vibrators and using. at least one detector to detect and record the composite received signal from all vibrators.

19. The method of claim 10 wherein the step of windowing the autocorrelations of the sequences of the cross-correlations between the various weakly correlated pseudorandom sequences employs a time window interval corresponding to approximately twice the listen time.

20. The method of claim 13 wherein the step of windowing the correlated data comprises windowing the correlated data over a time interval corresponding to approximately twice the listen time.

* * * * *